United States Patent
Kuwahara et al.

(10) Patent No.: US 10,291,728 B2
(45) Date of Patent: May 14, 2019

(54) LOCATION INFORMATION DISPLAY SYSTEM, PORTABLE COMMUNICATION TERMINAL, VEHICULAR COMMUNICATION DEVICE, AND COMPUTER PROGRAM PRODUCT

(71) Applicant: DENSO CORPORATION, Kariya, Aichi-pref. (JP)

(72) Inventors: Hiroshi Kuwahara, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/768,475

(22) PCT Filed: Sep. 12, 2016

(86) PCT No.: PCT/JP2016/076822
§ 371 (c)(1),
(2) Date: Apr. 13, 2018

(87) PCT Pub. No.: WO2017/064961
PCT Pub. Date: Apr. 20, 2017

(65) Prior Publication Data
US 2018/0309838 A1    Oct. 25, 2018

(30) Foreign Application Priority Data

Oct. 15, 2015 (JP) ................. 2015-203694

(51) Int. Cl.
*H04M 1/00* (2006.01)
*H04W 4/02* (2018.01)
(Continued)

(52) U.S. Cl.
CPC ............ *H04L 67/18* (2013.01); *G08G 1/005* (2013.01); *G08G 1/0962* (2013.01);
(Continued)

(58) Field of Classification Search
CPC ........ H04L 67/18; H04W 4/023; H04W 4/80; H04W 4/44; H04W 4/025; H04W 4/046; H04W 4/02; H04W 4/029; H04W 4/40
See application file for complete search history.

(56) References Cited

U.S. PATENT DOCUMENTS
2014/0092047 A1   4/2014 Nara et al.

FOREIGN PATENT DOCUMENTS
JP   2005258932 A   9/2005
JP   2006004318 A   1/2006
(Continued)

*Primary Examiner* — Nam T Huynh
(74) *Attorney, Agent, or Firm* — Harness, Dickey & Pierce, P.L.C.

(57) ABSTRACT

A location information display system includes a portable communication terminal receiving location information of respective users belonging to a predetermined group from a server, and a vehicular communication device receiving the location information from the portable communication terminal and displaying icons indicating present locations of the respective users identified based on the received location information by superimposing the icons on a map screen. The vehicular communication device notifies the portable communication terminal of a selection condition. The portable communication terminal acquires the selection condition from the vehicular communication device, selects one or more users who satisfy the acquired selection condition, and transmits the location information of the selected users to the vehicular communication device.

7 Claims, 19 Drawing Sheets

(51) Int. Cl.
*H04W 4/40* (2018.01)
*G08G 1/005* (2006.01)
*G09B 29/00* (2006.01)
*G09B 29/10* (2006.01)
*H04L 29/08* (2006.01)
*H04M 11/00* (2006.01)
*H04W 4/029* (2018.01)
*G08G 1/0962* (2006.01)

(52) U.S. Cl.
CPC .......... *G09B 29/007* (2013.01); *G09B 29/10* (2013.01); *H04M 1/00* (2013.01); *H04M 11/00* (2013.01); *H04W 4/023* (2013.01); *H04W 4/029* (2018.02); *H04W 4/40* (2018.02)

(56) References Cited

FOREIGN PATENT DOCUMENTS

| | | |
|---|---|---|
| JP | 2013190356 A | 9/2013 |
| JP | 2014098627 A | 5/2014 |
| JP | 2015072140 A | 4/2015 |
| WO | WO-2012141294 A1 | 10/2012 |

LOCATION INFORMATION DISPLAY SYSTEM, PORTABLE COMMUNICATION TERMINAL, VEHICULAR COMMUNICATION DEVICE, AND COMPUTER PROGRAM PRODUCT

CROSS REFERENCE TO RELATED APPLICATIONS

This application is a U.S. National Phase Application under 35 U.S.C. 371 of International Application No. PCT/JP2016/076822 filed on Sep. 12, 2016 and published in Japanese as WO 2017/064961 A1 on Apr. 20, 2017. This application is based on and claims the benefit of priority from Japanese Patent Application No. 2015-203694 filed on Oct. 15, 2015. The entire disclosures of all of the above applications are incorporated herein by reference.

TECHNICAL FIELD

The present disclosure relates to a location information display system, a portable communication terminal, a vehicular communication device, and a computer program product.

BACKGROUND ART

A location information sharing application (service) is now made available on a portable communication terminal, for example, a smartphone, and enables group-registered users to share location information of the respective users by displaying icons indicating present locations of the respective users by superimposing the icons on a map screen. In a system sharing location information as above, a portable communication terminal carried by each user in the group acquires location information by calculating a present location of its own by using a GPS (Global Positioning System) function, and displays an icon indicating the calculated present location of its own by superimposing the icon on the map screen while transmitting the acquired location information to a server. The server which has received the location information from the respective portable communication terminals collects the location information of the respective users in the group and transmits the collected location information of the respective users to respective portable communication terminals. The portable communication terminal which has received the location information from the server displays icons indicating the present locations of the respective users by superimposing the icons on the map screen. The users in the group can therefore determine more easily, for example, where and when to meet.

When a portable communication terminal is carried into a compartment of a vehicle, a recent system allows the portable communication terminal and a vehicular communication device, for example, a car navigation device to operate in cooperation by connecting the portable communication terminal and the vehicular communication device to enable data communications (see, for example Patent Literature 1).

PRIOR ART LITERATURE

Patent Literature

Patent Literature 1: JP 2014-98627 A

SUMMARY OF INVENTION

When a portable communication terminal and a vehicular communication device are connected to enable data communications while the location information sharing application is active on the portable communication terminal, the vehicular communication device receives location information of the respective users from the portable communication terminal and displays icons indicating present locations of the respective users by superimposing the icons on the map screen. The icons indicating the present locations of the respective users are displayed by superimposing the icons on the map screen of the vehicular communication device provided with a display unit having a larger display area than the portable communication terminal. Thus, a visibility of the icons can be improved for the user in the compartment.

The vehicular communication device, however, has specifications that differ from one device to another, and is generally inferior to the portable communication terminal in processing performance, such as a slower screen processing speed and a lower data transfer rate. Hence, a variety of problems may occur when the location information of all the users held in the portable communication terminal is sent to the vehicular communication device. For example, an icon indicating a present location of a user remote from the vehicular communication device and therefore of low importance is also displayed wastefully or quite a long time is required to start display of many icons.

In view of the foregoing difficulties, it is an object of the present disclosure to provide a location information display system enabling a vehicular communication device which has received location information of a user from a portable communication terminal to appropriately display an icon indicating a present location of a user by superimposing an icon on a map screen, and it is also an object of the present disclosure to provide a portable communication terminal, a vehicular communication device, and a computer program product related to the location information display system.

According to an aspect of the present disclosure, a portable communication terminal receives location information of respective users belonging to a predetermined group from a server. A vehicular communication device receives the location information from the portable communication terminal and displays icons indicating present locations of the respective users identified based on the received location information by superimposing the icons on a map screen. The vehicular communication device notifies the portable communication terminal of a selection condition. The portable communication terminal acquires the selection condition from the vehicular communication device, selects one or more users who satisfy the acquired selection condition, and transmits the location information of the selected one or more users to the vehicular communication device.

In the above configuration, the portable communication terminal does not transmit location information of all the users held in itself, and instead transmits location information of respective users who satisfy the selection condition among all the users held in itself to the vehicular communication device. The configuration as above is capable of forestalling a variety of problems, for example, an icon indicating a present location of a user remote from the vehicular communication device and therefore of low importance is also displayed wastefully or quite a long time is required to start to display many icons. The vehicular communication device is thus capable of appropriately displaying icons indicating present locations of the respective users by superimposing the icons on the map screen.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, one embodiment of the present disclosure will be described with reference to the drawings.

Figure 1:
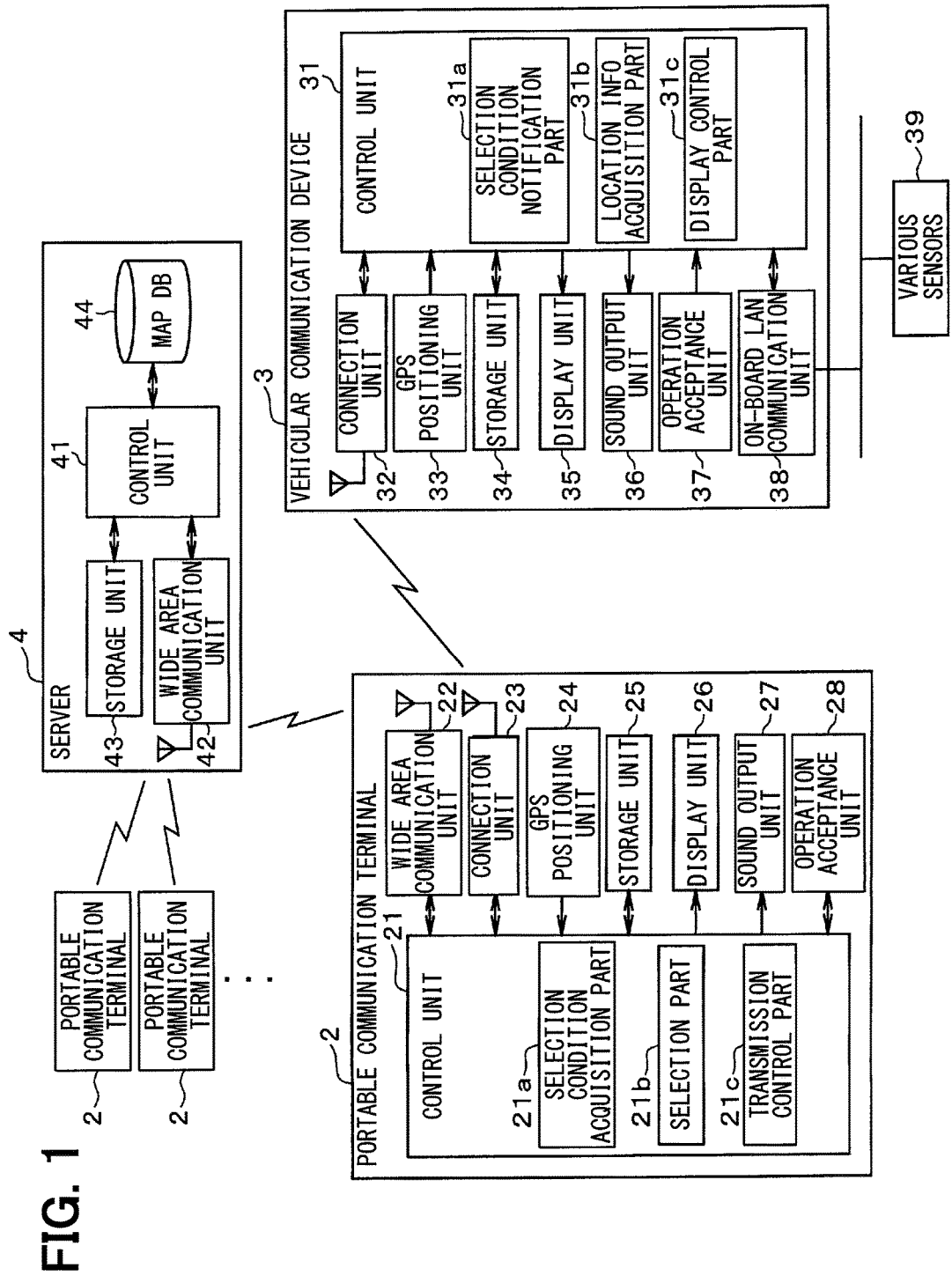
FIG. 1 is a view showing an overall configuration of a location information display system according to one embodiment of the present disclosure.

As is shown in FIG. 1, a location information display system 1 includes a portable communication terminal 2 carried by a user, and a vehicular communication device 3 installed to a vehicle. The portable communication terminal 2 is, for example, a smartphone (multi-functional mobile phone), and the vehicular communication device 3 is, for example, a car navigation device. When the portable communication terminal 2 is carried into a compartment and the portable communication terminal 2 and the vehicular communication device 3 are connected, the portable communication terminal 2 and the vehicular communication device 3 are allowed to perform data communications. Data communications between the portable communication terminal 2 and the vehicular communication device 3 are made by methods known as, for example, Bluetooth (registered trademark), BLE (Bluetooth Low Energy), WIFI (Wireless Fidelity) (registered trademark), and USB (Universal Serial Bus). The portable communication terminal 2 provides a location information sharing application (service) enabling group-registered users to share location information of the respective users by displaying present locations of the respective users by superimposing the present locations on a map screen. A location information sharing system implementing a location information sharing service is constructed by connecting multiple portable communication terminals 2 included in a group to a server 4 to enable communications via a wide area communication network including the Internet.

The portable communication terminal 2 has a control unit 21, a wide area communication unit 22, a connection unit 23, a GPS (Global Positioning System) positioning unit 24, a storage unit 25, a display unit 26, a sound output unit 27, and an operation acceptance unit 28. The control unit 21 is provided by a microcomputer having a CPU (Central Processing Unit), a ROM (Read Only Memory), a RAM (Random Access Memory), and an I/O (Input-Output). By running a computer program pre-stored in a non-transitory tangible recording media, the control unit 21 executes processing corresponding to the computer program and thereby controls an overall operation of the portable communication terminal 2.

The wide area communication unit 22 performs wide area communications with the server 4. The connection unit 23 connects to the vehicular communication device 3 while the portable communication terminal 2 is inside the compartment and performs data communications with the vehicular communication device 3. The GPS positioning unit 24 receives a GPS signal by trapping a GPS radio wave radiated from a GPS satellite, and acquires location information (that is, determines a position) by calculating a present location (latitude, longitude, and altitude) of its own terminal by using parameters extracted from the received GPS signal. In the storage unit 25, a user ID by which its own terminal can be identified, and user IDs assigned to respective portable communication terminals 2 carried by users in the group (that is, respective group-registered users) are stored.

The display unit 26 is provided by, for example, a liquid crystal display capable of displaying a color image. Upon input of a display command signal from the control unit 21, the display unit 26 displays (draws) a screen specified by the inputted display command signal. The display unit 26 is not limited to a liquid crystal display, and may be provided by a plasma display, an organic EL (Electro-Luminescence) display, or the like instead. The sound output unit 27 is provided by a speaker. Upon input of a sound output command signal from the control unit 21, the sound output unit 27 outputs a sound specified by inputted the sound output command.

The operation acceptance unit 28 is configured integrally with the display unit 26 and includes mechanical switches, a touch panel provided on a screen of the display unit 26, and so on. Upon acceptance of an operation made by the user, the operation acceptance unit 28 outputs an operation sensing signal indicating a content of the operation to the control unit 21. The touch panel may adopt a pressure-sensitive method, an electromagnetic induction method, a capacitance method, or a combination of the foregoing methods. Besides the functions described above, the portable communication terminal 2 has various other known telephone functions, such as a function of inputting a sound uttered by the user as an outgoing call sound, a function of outputting a sound received from a communication party via a communication network as an incoming call sound, and a function of storing address book data.

The server 4 has a control unit 41, a wide area communication unit 42, a storage unit 43, and a map database 44.

The control unit 41 is provided by a microcomputer having a CPU, a ROM, a RAM, and an I/O. By running a computer program pre-stored in a non-transitory tangible recording medium, the control unit 41 performs processing corresponding to the computer program and thereby controls an overall operation of the server 4. The wide area communication unit 42 performs wide area communications with the portable communication terminal 2. The storage unit 43 stores a user ID in correspondence with location information specifying a present location of a user assigned with the user ID. In the map database 44, a database of map information is stored.

According to the configuration described above, by activating a location information sharing application pre-installed to itself, the portable communication terminal 2 displays an icon (figure) indicating a present location of its own by superimposing the icon on a map screen as described below. The portable communication terminal 2 also receives location information of the respective users in the group from the server 4 by performing wide area communications with the server 4, and displays icons indicating present locations of the respective users identified based on the received location information by superimposing the icons on the map screen. By displaying icons indicating present locations of the respective users in the group by superimposing the icons on the map screen of the portable communication terminal 2, the users in the group can determine where and when to meet more easily.

The vehicular communication device 3 has a control unit 31, a connection unit 32, a GPS positioning unit 33, a storage unit 34, a display unit 35, a sound output unit 36, an operation acceptance unit 37, and an on-board LAN (Local Area Network) communication unit 38. The control unit 31 is provided by a microcomputer having a CPU, a ROM, a RAM, and an I/O. By running a computer program pre-stored in a non-transitory tangible recording medium, the control unit 31 performs processing corresponding to the computer program and thereby controls an overall operation of the vehicular communication device 3.

The connection unit 32 connects to the portable communication terminal 2 while the portable communication terminal 2 is inside the compartment, and performs data communications with the portable communication terminal 2. The GPS positioning unit 33 receives a GPS signal by trapping a GPS radio wave radiated from the GPS satellite, and acquires location information (that is, determines a position) by calculating a present location (latitude, longitude, and altitude) of its own device by using parameters extracted from the received GPS signal. The storage unit 34 stores various types of information.

The display unit 35 is provided by, for example, a liquid crystal display capable of displaying a color image. Upon input of a display command signal from the control unit 31, the display unit 35 displays (draws) a screen specified by the display command signal inputted. The display unit 35 is not limited to a liquid crystal display, and may be provided by a plasma display, an organic EL (Electro-Luminescence) display, or the like instead. The sound output unit 36 is provided by a speaker. Upon input of a sound output command signal from the control unit 31, the sound output unit 36 outputs a sound specified by the sound output command inputted.

The operation acceptance unit 37 is configured integrally with the display unit 35, and includes mechanical switches, a touch panel provided onto a screen of the display unit 35, and so on. Upon acceptance of an operation made by the user, the operation acceptance unit 37 outputs an operation sensing signal indicating a content of the operation to the control unit 31. The touch panel may adopt a pressure-sensitive method, an electromagnetic induction method, a capacitance method, or a combination of the foregoing methods. The on-board LAN communication unit 38 is connected to various sensors 39 mounted to the vehicle via an on-board LAN, and receives sensor signals from the respective sensors 39, which include, for example, a speed sensor and an acceleration sensor.

According to the configuration described above, when a cooperative application installed to the vehicular communication device 3 is active, the portable communication terminal 2 is allowed to perform data communications with the vehicular communication device 3 by activating a cooperative application installed to itself. Hence, the portable communication terminal 2 becomes capable of transmitting location information of the respective users in the group received from the server 4 to the vehicular communication device 3. The vehicular communication device 3 which has received the location information of the respective users in the group from the portable communication terminal 2 becomes capable of displaying icons indicating present locations of the respective users by superimposing the icons on the map screen. While the portable communication terminal 2 and the vehicular communication device 3 are allowed to perform data communications as above, each of the portable communication terminal 2 and the vehicular communication device 3 is capable of displaying icons indicating present locations of the respective users by superimposing the icons on the map screen. Herein, the portable communication terminal 2 displays the map screen according to map information received from a map server (not shown), and the vehicular communication device 3 displays the map screen according to map information read out from a recording medium, such as an HD (Hard Disk) or a DVD (Digital Versatile Disk). Hence, contents and amounts of information are different between the two map screens. Also, while the portable communication terminal 2 and the vehicular communication device 3 are connected and allowed to perform data communications, a present location of the portable communication terminal 2 calculated by itself and a present location of the vehicular communication device 3 calculated by itself are substantially same.

In the portable communication terminal 2, the control unit 21 has a selection condition acquisition part 21*a*, a selection part 21*b*, and a transmission control part 21*c* as functions related to the present disclosure. The selection condition acquisition part 21*a* acquires a selection condition sent from the vehicular communication device 3 and received at the connection unit 23. The selection condition includes a maximum number of displayable users, a display range, a maximum data transfer volume, and so on. The maximum number of displayable users indicates a maximum number of users as subjects when the control unit 31 of the vehicular communication device 3 controls the display unit 35 to display icons indicating present locations of the users. The display range is a region dependent on a map reduction scale and a display reference orientation set in the display unit 35 of the vehicular communication device 3, and set by an operation by the user on the operation acceptance unit 37, for example, by operating a zoom-in key or a zoom-out key, or a switch key switching from a north-up display (a display with a north direction upward) to a heading-up display (a display with a vehicle moving direction upward) and vice versa. The selection condition acquisition part 21*a* acquires at least two coordinate points and acquires a display range of a quadrangular shape (for example, a rectangular shape)

with a diagonal line linking the two coordinate points. A maximum data transfer volume is a maximum volume of data to be sent by the portable communication terminal 2 from the connection unit 23 to the vehicular communication device 3 under control of the control unit 21.

When the selection condition acquisition part 21a acquires the selection condition, the selection part 21b selects a user who satisfies the selection condition. More specifically, when the maximum number of displayable users is determined as being the selection condition, the selection part 21b selects users who satisfy a condition that the number of users in order of increasing distance from a present location of the portable communication terminal 2 is equal to or less than the maximum number of displayable users. When the display range is determined as being the selection condition, the selection part 21b selects users who satisfy a condition that users are present in a map range corresponding at least to the display range. When the maximum data transfer volume is determined as being the selection condition, the selection part 21b selects users who satisfy a condition that a total of data volumes of users in order of increasing distance from a present location of the portable communication terminal 2 does not exceed the maximum data transfer volume.

The selection conditions specified above may be determined either solely or in combination. That is, when the maximum number of displayable users and the display range are determined as being the selection condition, the selection part 21b selects users who satisfy a condition that the number of users present in a map range corresponding at least to the display range in order of increasing distance from a present location of the portable communication terminal 2 is equal to or less than the maximum number of displayable users. When the maximum number of displayable users, the display range, and the maximum data transfer volume are determined as being the selection condition, the selection part 21b selects users who satisfy a condition that the number of users present in a map range corresponding at least to the display range in order of increasing distance from a present location of the portable communication terminal 2 is equal to or less than the maximum number of displayable users to an extent that a total of data volumes does not exceed the maximum data transfer volume. When the users who satisfy the selection condition are selected by the selection part 21b, the transmission control part 21c controls the portable communication terminal 2 to transmit location information of the respective users thus selected to the vehicular communication device 3 from the connection unit 23.

In the vehicular communication device 3, the control unit 31 has a selection condition notification part 31a, a location information acquisition part 31b, and a display control part 31c as functions related to the present disclosure. The selection condition notification part 31a notifies the portable communication terminal 2 of the selection condition by controlling the vehicular communication device 3 to transmit the selection condition to the portable communication terminal 2 from the connection unit 32. The location information acquisition part 31b acquires location information of the respective users sent from the portable communication terminal 2 and received at the connection unit 32. When the location information of the respective users is acquired by the location information acquisition part 31b, the display control part 31c displays icons indicating present locations of the respective users identified based on the location information of the respective users by superimposing the icons on the map screen.

An operation of the configuration above will now be described with reference to FIG. 2 through FIG. 19. The following will describe processing performed by the portable communication terminal 2, processing performed by the vehicular communication device 3, and processing performed by the server 4.

(1) Processing Performed by Portable Communication Terminal 2

Figure 2:
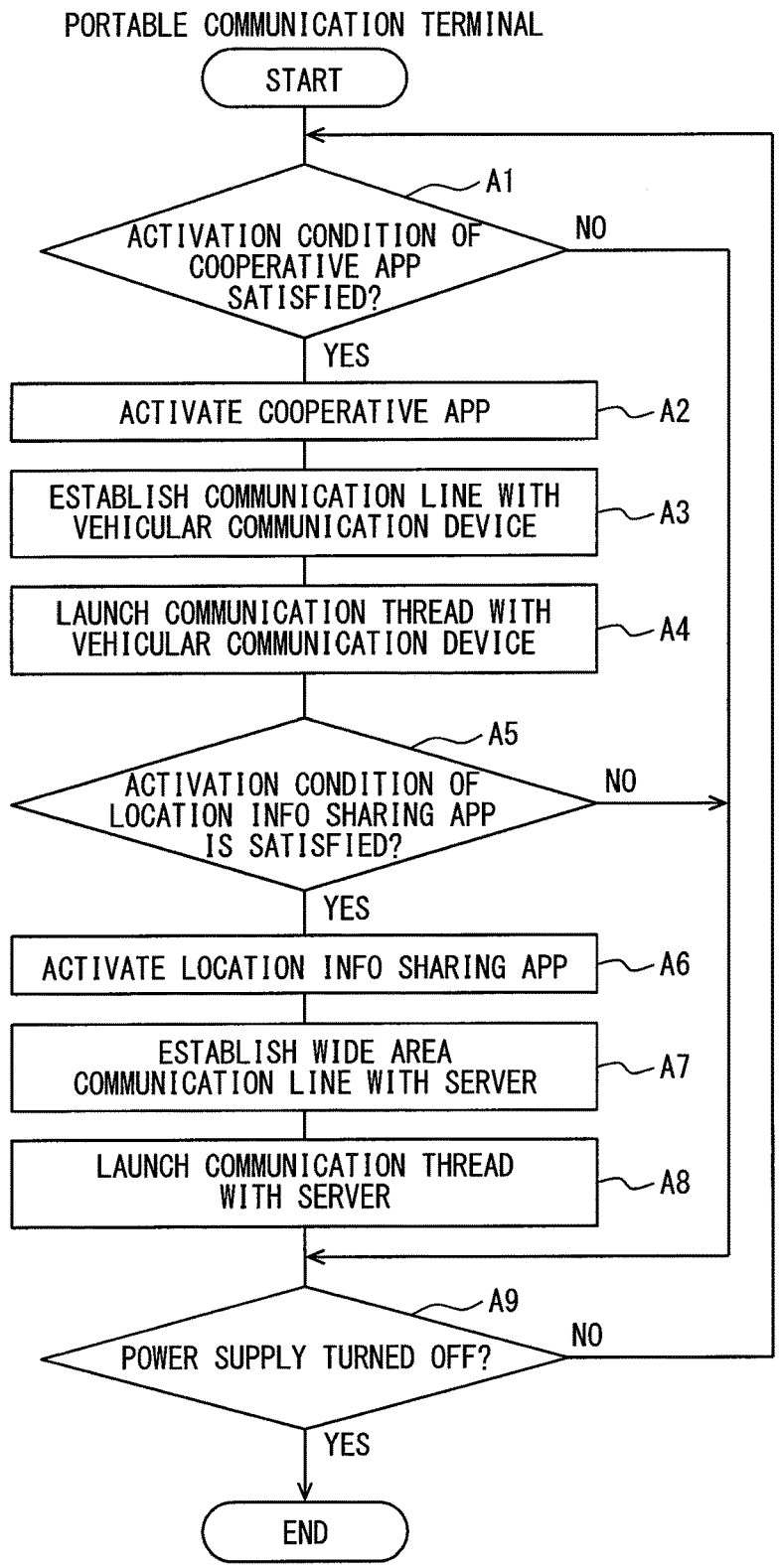
FIG. 2 is a flowchart (part 1) depicting processing executed by a portable communication terminal.

In the portable communication terminal 2, as is depicted in FIG. 2, the control unit 21 determines whether an activation condition of the cooperative application is satisfied when a power supply of the portable communication terminal 2 is turned ON (A1). For example, when the user makes a predetermined operation or when the portable communication terminal 2 and the vehicular communication device 3 come within a predetermined distance of each other short enough to transmit and receive radio waves, the control unit 21 determines that the activation condition of the cooperative application is satisfied (A1: YES), and activates the cooperative application (A2). After the control unit 21 activates the cooperative application, the control unit 21 controls the connection unit 23 to establish a communication line with the connection unit 32 of the vehicular communication device 3 (A3), and launches a communication thread with the vehicular communication device 3 (A4).

Figure 3:
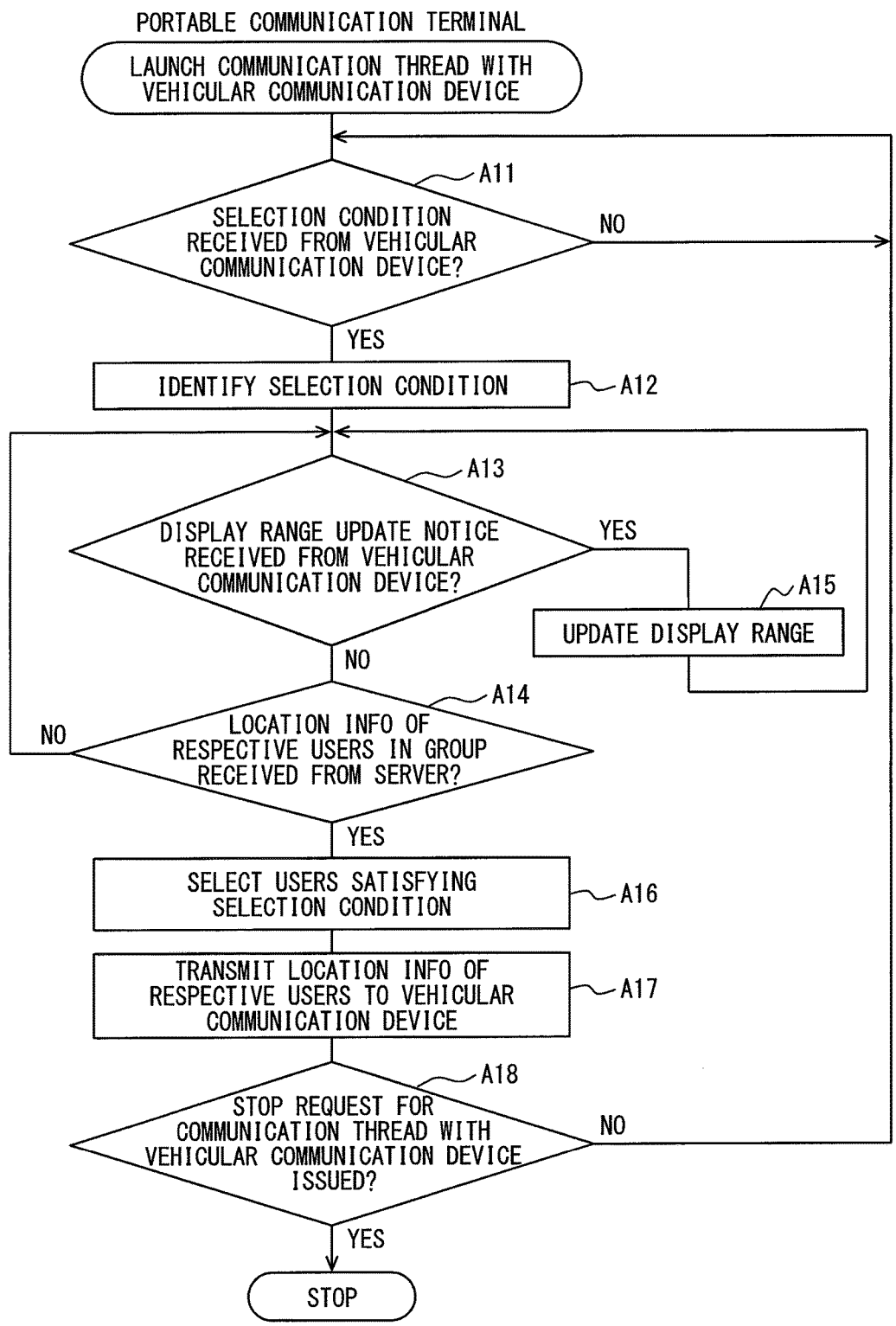
FIG. 3 is a flowchart (part 2) depicting the processing executed by the portable communication terminal.

After the control unit 21 launches the communication thread with the vehicular communication device 3, as is depicted in FIG. 3, the control unit 21 determines whether the selection condition from the vehicular communication device 3 has been received (A11). When the control unit 21 determines that the selection condition from the vehicular communication device 3 has been received at the connection unit 23 (A11: YES, corresponding to a selection condition acquisition step), the control unit 21 identifies the received selection condition (A12). For example, when the maximum number of displayable users, the display range, and the maximum data transfer volume are determined as being the selection condition, the control unit 21 identifies the maximum number of displayable users, the display range, and the maximum data transfer volume as the selection condition.

Subsequently, the control unit 21 determines whether an update notice of the display range from the vehicular communication device 3 has been received at the connection unit 23 (A13), and also determines whether location information of the respective users in the group has been received from the server 4 (A14). When the control unit 21 determines that an update notice of the display range from the vehicular communication device 3 has been received at the connection unit 23 (A13: YES), the control unit 21 updates the display range to a display range notified by the received update notice (A15). When the control unit 21 determines that the location information of the respective users in the group has been received from the server 4 through the communication thread with the server 4 launched earlier (A14: YES), the control unit 21 selects users who satisfy the selection condition (A16, corresponding to a selection step) which will be described in detail below.

After the control unit 21 selects the users who satisfy the selection condition, the control unit 21 controls the portable communication terminal 2 to transmit the location information of the respective users thus selected to the vehicular communication device 3 from the control unit 23 (A17, corresponding to a transmission control step). The control unit 21 then determines whether a stop request for the communication thread with the vehicular communication device 3 has been issued (A18). When the control unit 21 determines that a stop request for the communication thread with the vehicular communication device 3 has not been issued (A18: NO), the control unit 21 returns to Step A11 and repeats Step A11 and the subsequent steps. When the control unit 21 determines that a stop request for the communication thread with the vehicular communication device 3 has been issued (A18: YES), the control unit 21 stops the communication thread with the vehicular communication device 3.

After the control unit 21 launches the communication thread with the vehicular communication device 3, the control unit 21 also determines whether an activation condition of the location information sharing application is satisfied (A5). For example, when the user makes a predetermined operation, the control unit 21 determines that the activation condition of the location information sharing application is satisfied (A5: YES), and activates the location information sharing application (A6). After the control unit 21 activates the location information sharing application, the control unit 21 controls the wide area communication unit 22 to establish a wide area communication line with the wide area communication unit 42 of the server 4 (A7), and launches a communication thread with the server 4 (A8).

Figure 4:
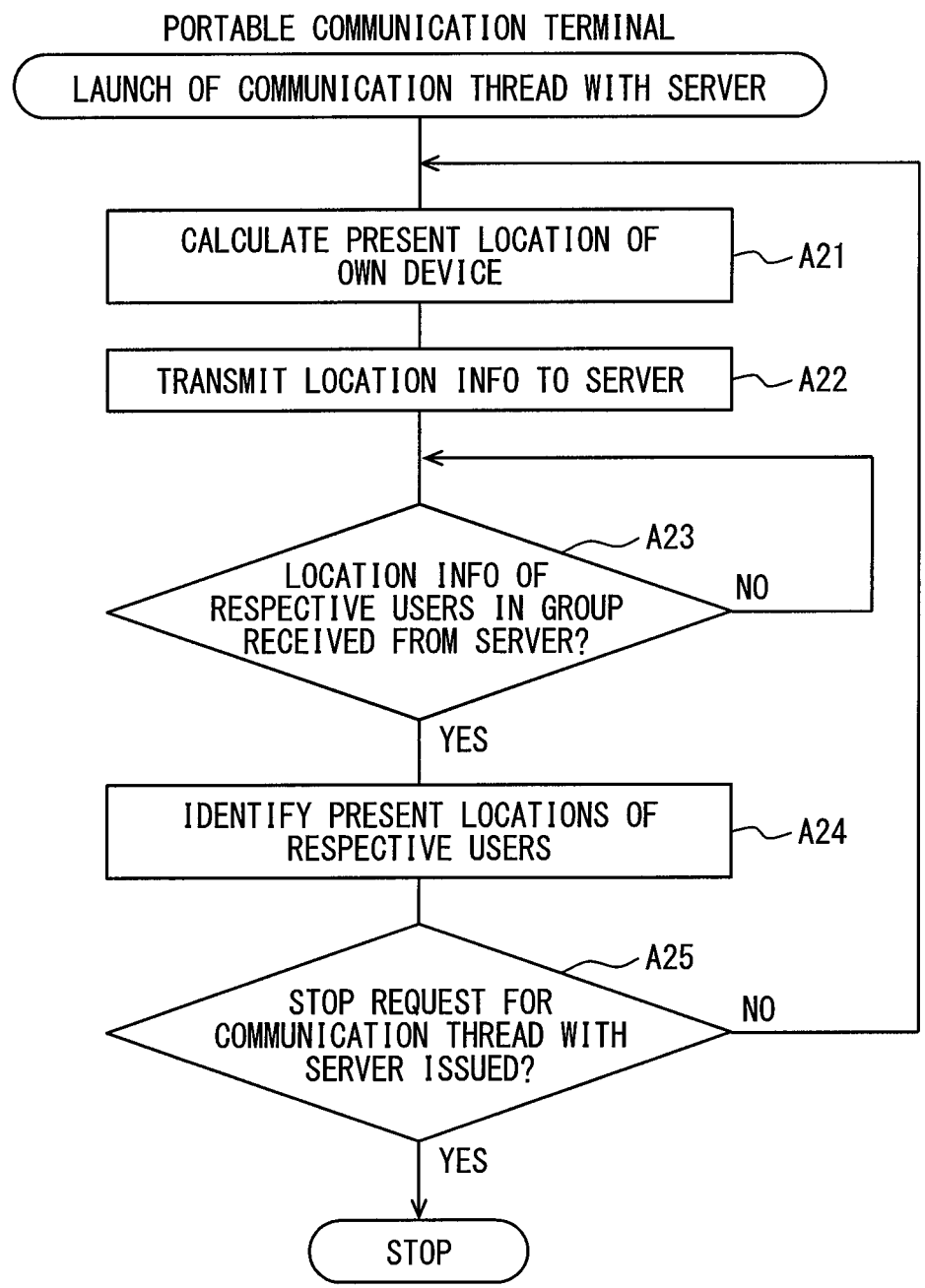
FIG. 4 is a flowchart (part 3) depicting the processing executed by the portable communication terminal.

After the control unit 21 launches the communication thread with the server 4, as is depicted in FIG. 4, the control unit 21 calculates a present location of its own terminal by the GPS positioning unit 24 (A21). Subsequently, the control unit 21 controls the portable communication terminal 2 to transmit location information indicating the calculated present location to the server 4 from the wide area communication unit 22 (A22), and waits until location information of the respective users in the group is received from the server 4 (A23). When the control unit 21 determines that the location information of the respective users in the group from the server 4 has been received at the wide area communication unit 22 (A23: YES), the control unit 21 identifies present locations of the respective users by using the received location information (A24). Subsequently, the control unit 21 determines whether a stop request for the communication thread with the server 4 has been issued (A25). When the control unit 21 determines that a stop request for the communication thread with the server 4 has not been issued (A25: NO), the control unit 21 returns to Step A21 and repeats Step A21 and the subsequent steps. When the control unit 21 determines that a stop request for the communication thread with the server 4 has been issued (A25: YES), the control unit 21 stops the communication thread with the server 4.

Subsequently, the control unit 21 determines whether the power supply of the portable communication terminal 2 is turned OFF (A9), and a sequence of the processing steps as above is repeated until the control unit 21 determines that the power supply of the portable communication terminal 2 is turned OFF. When the control unit 21 determines that the power supply of the portable communication terminal 2 is turned OFF (A9: YES), the control unit 21 ends a sequence of the processing steps. The above has described a case where the control unit 21 activates the cooperative application before the location information sharing application as an example. Alternatively, the control unit 21 may activate the location information sharing application before the cooperative application.

(2) Processing Performed by Vehicular Communication Device 3

Figure 5:
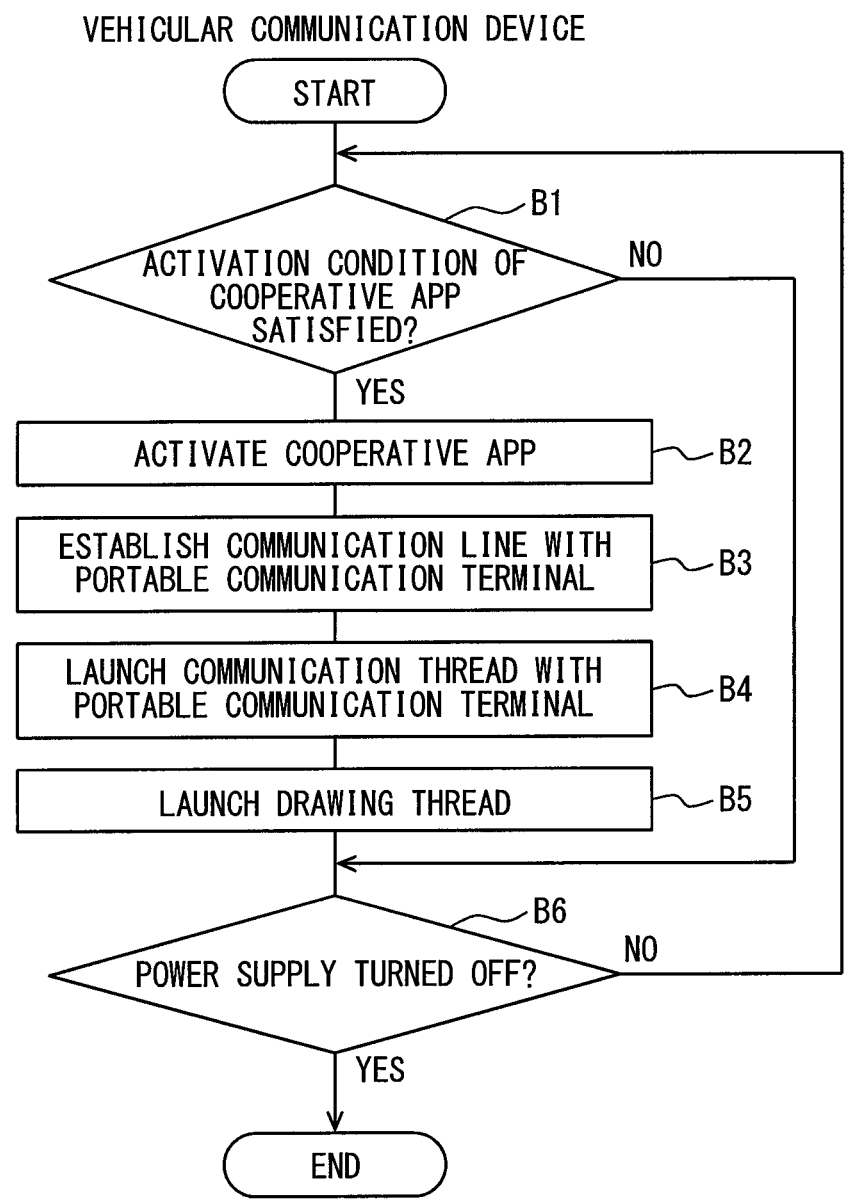
FIG. 5 is a flowchart (part 1) depicting processing executed by a vehicular communication device.

In the vehicular communication device 3, as is depicted in FIG. 5, when a power supply of the vehicular communication device 3 is turned ON by, for example, switching an ACC (accessary) ON from OFF, the control unit 31 determines whether the activation condition of the cooperative application is satisfied (B1). For example, when the user makes a predetermined operation or when the portable communication terminal 2 and the vehicular communication device 3 come within a predetermined distance of each other short enough to transmit and receive a radio wave, the control unit 31 determines that the activation condition of the cooperative application is satisfied (B1: YES), and activates the cooperative application (B2). After the control unit 31 activates the cooperative application, the control unit 31 controls the connection unit 32 to establish a communication line with the connection unit 23 of the portable communication terminal 2 (B3). The control unit 31 then launches a communication thread with the portable communication terminal 2 (B4) and also launches a drawing thread (B5).

Figure 6:
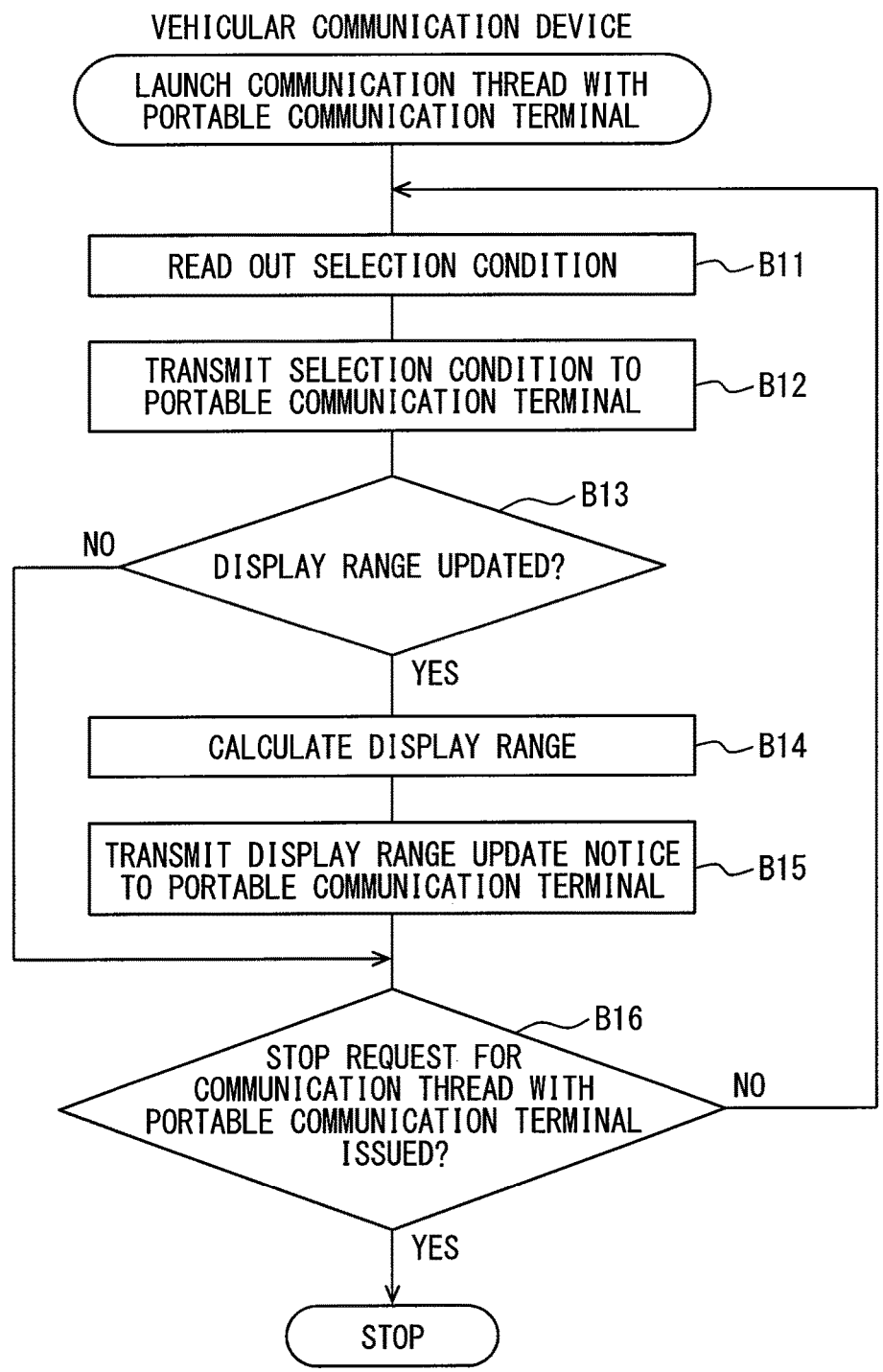
FIG. 6 is a flowchart (part 2) depicting the processing executed by the vehicular communication device.

After the control unit 31 launches the communication thread with the portable communication terminal 2, as is depicted in FIG. 6, the control unit 31 reads out the preliminarily set selection condition (B11), and controls the vehicular communication device 3 to transmit the read selection condition to the portable communication terminal 2 from the connection unit 32 (B12, corresponding to a selection condition notification step). When the maximum number of displayable users, the display range, and the maximum data transfer volume are preliminarily set as the selection condition, the control unit 31 controls the vehicular communication device 3 to transmit the maximum number of displayable users, the display range, and the maximum data transfer volume to the portable communication terminal 2 from the connection unit 32.

The control unit 31 also determines whether the display range has been updated (B13). For example, when the user operates the zoom-in key, the zoom-out key, or the switch key switching from the north-up display to the heading-up display and vice versa, the control unit 31 determines that the display range has been updated (B13:YES). The control unit 31 then calculates the updated display range (B14) and controls the vehicular communication device 3 to transmit an update notice notifying the updated display range including two coordinate points linked by a diagonal line of the calculated display range to the portable communication terminal 2 from the connection unit 32 (B15). Subsequently, the control unit 31 determines whether a stop request for the communication thread with the portable communication terminal 2 has been issued (B16). When the control unit 31 determines that a stop request for the communication thread with the portable communication terminal 2 has not been issued (B16: NO), the control unit 31 returns to Step B11 and repeats Step B11 and the subsequent steps. When the control unit 31 determines that a stop request for the communication thread with the portable communication terminal 2 has been issued (B16: YES), the control unit 31 stops the communication thread with the portable communication terminal 2.

Figure 7:
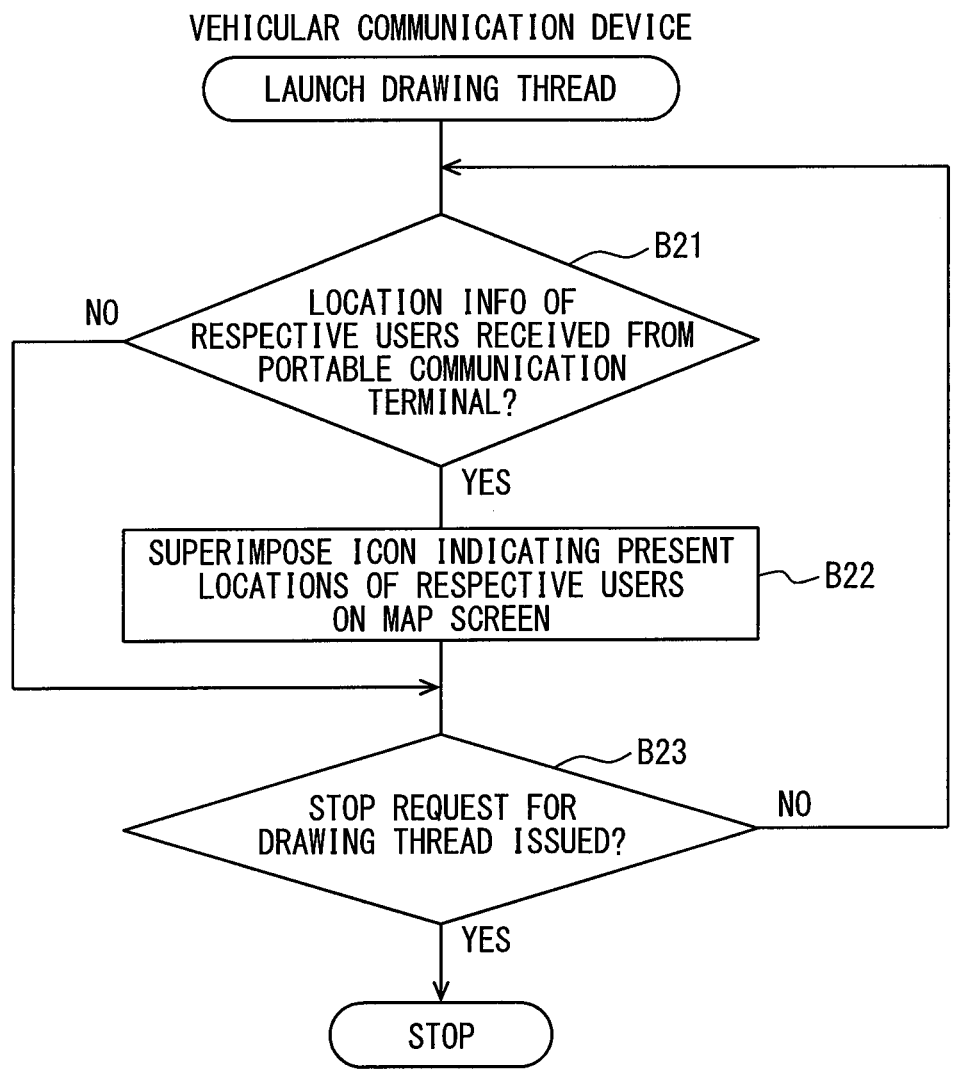
FIG. 7 is a flowchart (part 3) depicting the processing executed by the vehicular communication device.

After the control unit 31 launches the drawing thread, as is depicted in FIG. 7, the control unit 31 determines whether location information of the respective users from the portable communication terminal 2 has been received at the connection unit 32 (B21). When the control unit 31 determines that the location information of the respective users from the portable communication terminal 2 has been received at the connection unit 32 (B21: YES, corresponding to a location information acquisition step), the control unit 31 displays icons indicating present locations of the respective received users by superimposing the icons on the map screen (B22, corresponding to a display control step). Subsequently, the control unit 31 determines whether a stop request for the drawing thread has been issued (B23). When the control unit 31 determines that a stop request for the drawing thread has not been issued (B23: NO), the control unit 31 returns to Step B21 and repeats Step B21 and the subsequent steps. When the control unit 31 determines that a stop request for the drawing thread has been issued (B23: YES), the control unit 31 stops the drawing thread.

Subsequently, the control unit 31 determines whether the power supply of the vehicular communication device 3 is turned OFF (B6). The control unit 31 repeats a sequence of the processing steps as above until the control unit 31 determines that the power supply of the vehicular communication device 3 is turned OFF by, for example, switching the ACC OFF from ON. When the control unit 31 determines that the power supply of the vehicular communication device 3 is turned OFF (B6: YES), the control unit 31 ends the sequence of the processing steps.

(3) Processing Performed by Server 4

Figure 8:
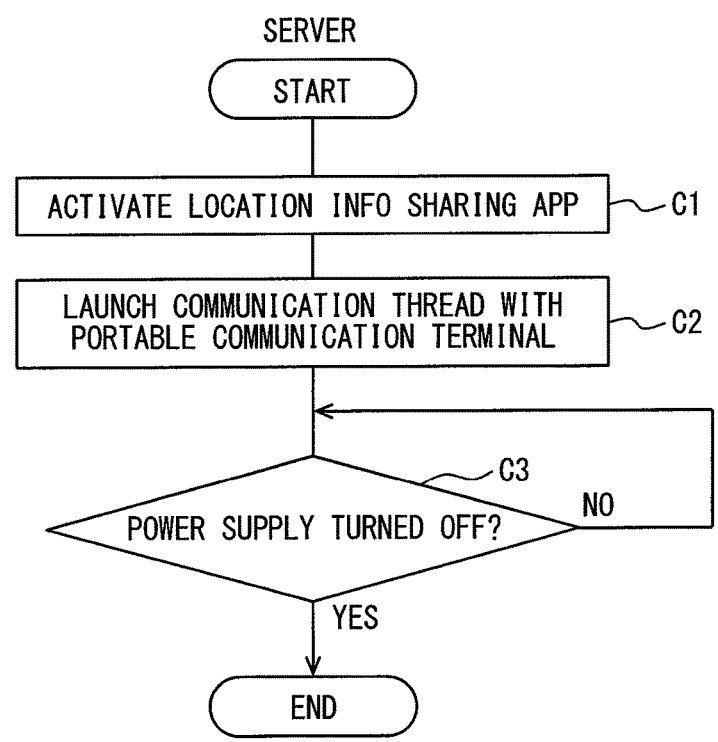
FIG. 8 is a flowchart (part 1) depicting processing executed by a server.
Figure 9:
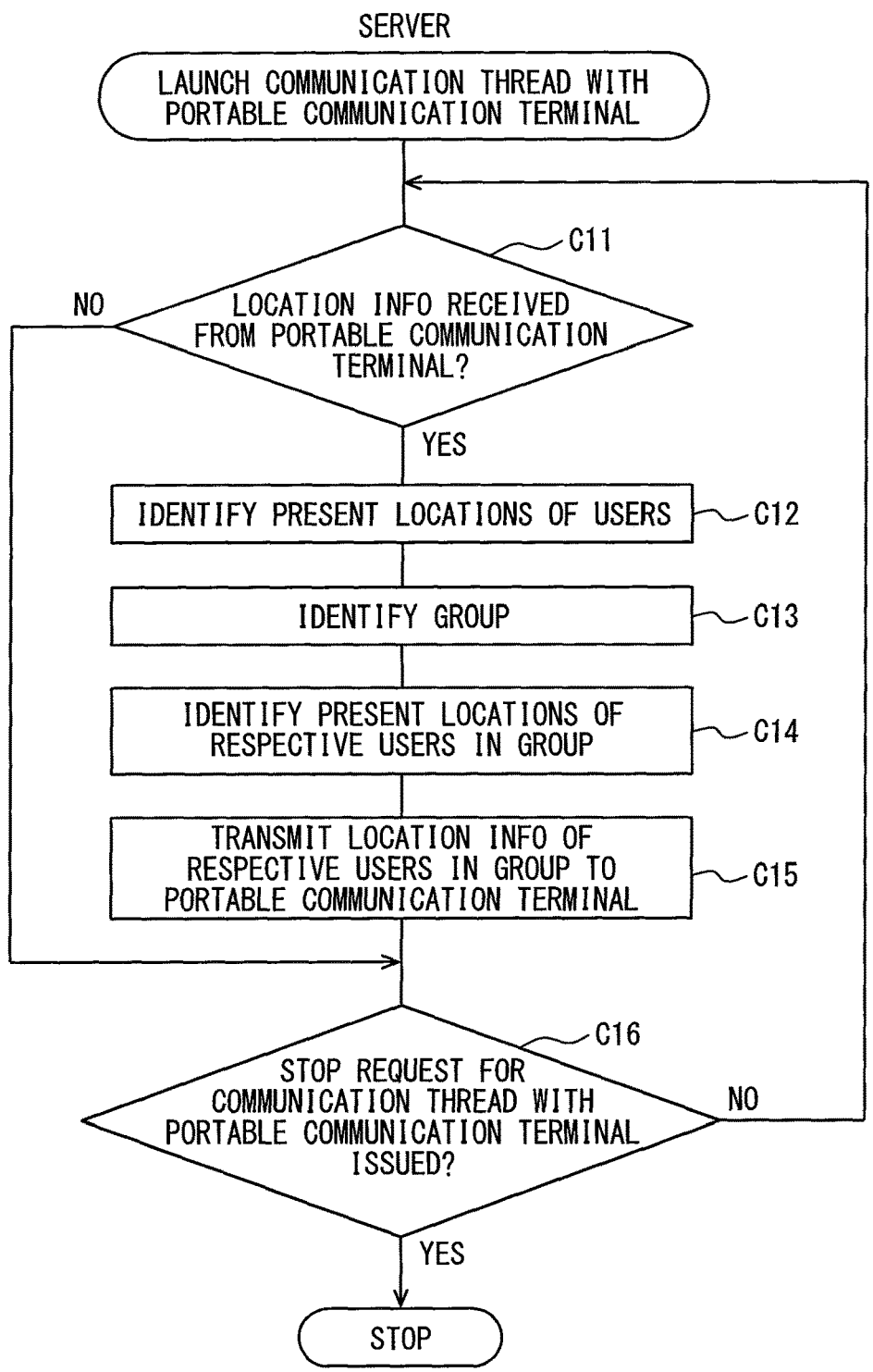
FIG. 9 is a flowchart (part 2) depicting the processing executed by the server.

In the server 4, as is depicted in FIG. 8, when a power supply of the server 4 is turned ON, the control unit 41 activates the location information sharing application (C1), and launches a communication thread with the portable communication terminal 2 (C2). After the control unit 41 launches the communication thread with the portable communication terminal 2, as is depicted in FIG. 9, the control unit 41 determines whether location information from the portable communication terminal 2 has been received at the wide area communication unit 42 (C11). When the control unit 41 determines that the location information from the portable communication terminal 2 has been received at the wide area communication unit 42 (C11: YES), the control unit 41 identifies a present location of the user carrying the portable communication terminal 2 as a transmission source of the location information (C12). The control unit 41 further identifies a group to which the portable communication terminal 2 as the transmission source of the location information belongs (C13) and identifies present locations of the respective users in the identified group (C14). Subsequently, the control unit 41 controls the server 4 to transmit location information with which the present locations of the respective users in the identified group can be identified to the portable communication terminal 2 from the wide area communication unit 42 (C15). Subsequently, the control unit 41 determines whether a stop request for the communication thread with the portable communication terminal 2 has been issued (C16). When the control unit 41 determines that a stop request for the communication thread with the portable communication terminal 2 has not been issued (B16: NO), the control unit 41 returns to Step C11 and repeats Step C11 and the subsequent steps. When the control unit 41 determines that a stop request for the communication thread with the portable communication terminal 2 has been issued (C16: YES), the control unit 41 stops the communication thread with the portable communication terminal 2.

Also, the control unit 41 determines whether the power supply of the server 4 is turned OFF (C3). When the control unit 41 determines that the power supply of the server 4 is turned OFF (C3: YES), the control unit 41 ends a sequence of the processing steps. The control unit 41 controls the server 4 to transmit location information of the respective users in the group to the portable communication terminal 2 from the wide area communication unit 42 in every predetermined period set in advance (for example, every 10 seconds).

The processing described above is performed by the portable communication terminal 2, the vehicular communication device 3, and the server 4 in cooperation. In the above-described configuration, the portable communication terminal 2 which has received the location information of the respective users in the group from the server 4 does not transmit the location information of all the users to the vehicular communication device 3, and instead transmits the location information of respective users who satisfy the selection condition acquired from the vehicular communication device 3 to the vehicular communication device 3. In a case where the location information of all the users held in the portable communication terminal 2 is sent to the vehicular communication device 3, a variety of problems are expected to occur. For example, an icon of a user remote from the vehicular communication device 3 and therefore of low importance is also displayed wastefully, or quite a long time is required to start to display many icons. The present embodiment forestalls such problems by a configuration that the portable communication terminal 2 transmits location information of respective users who satisfy the selection condition acquired from the vehicular communication device 3 to the vehicular communication device 3.

Figure 10:
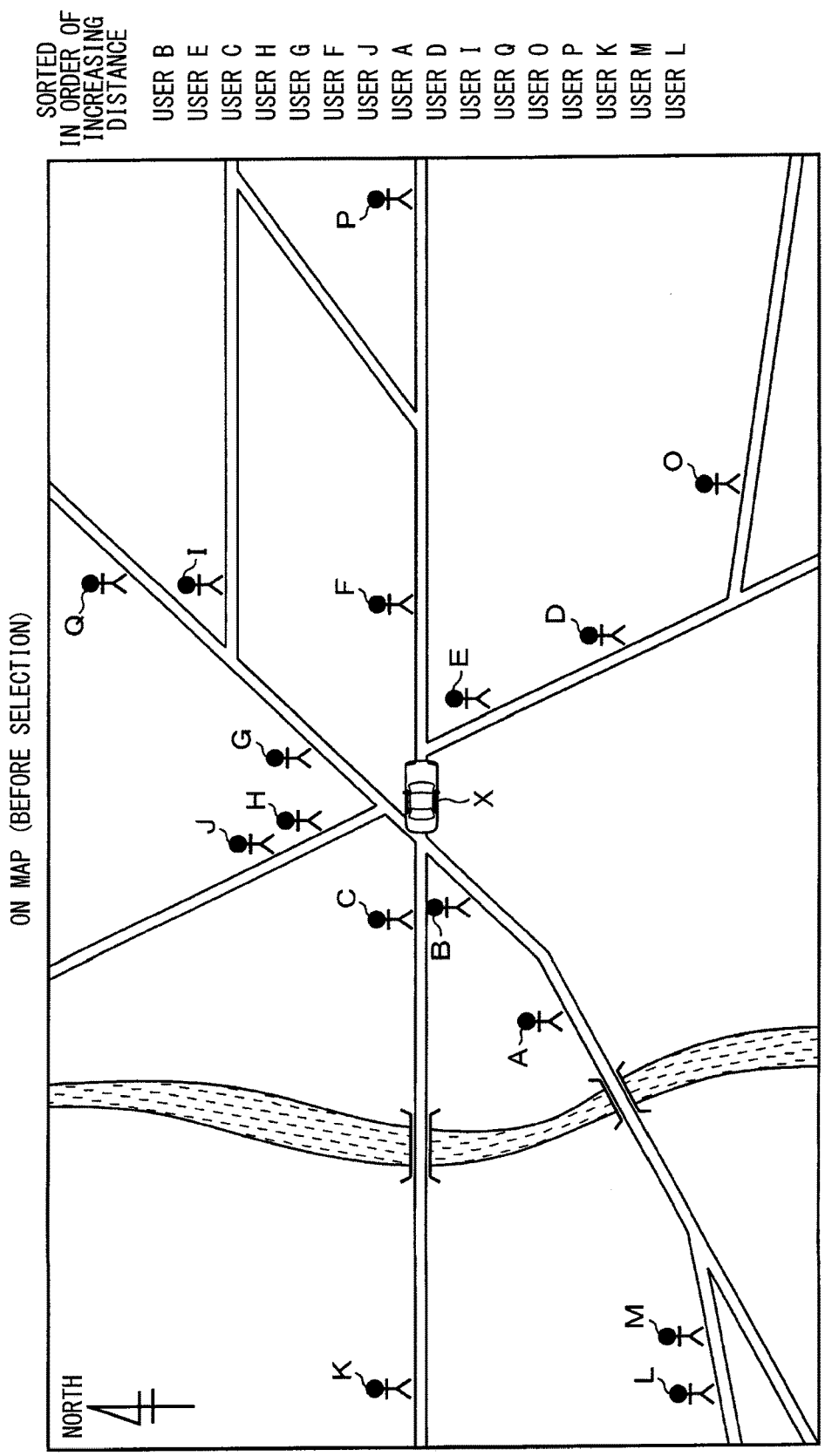
FIG. 10 is a view showing present locations of respective users on a map.

The following will describe steps by which the control unit 21 in the portable communication terminal 2 selects users who satisfy the selection condition. Assume that, as is shown in FIG. 10, a vehicle X in which the portable communication terminal 2 and the vehicular communication device 3 are able to perform data communications is headed eastward on a road extending in an east-west direction, and that sixteen users including a user A through a user L are present on a periphery of the vehicle X as users belonging to a group the user of the portable communication terminal 2 belongs to.

The control unit 21 receives location information of the respective users in the group from the server 4 at the wide area communication unit 22 and identifies present locations of the respective users by using the received location information. The control unit 21 then calculates distances from a coordinate of the present location of the portable communication terminal 2 to coordinates of the present locations of the respective users, and sorts the present locations of the respective users in order of increasing distance from the present location of the portable communication terminal 2 (substantially same as a present location of the vehicular communication device 3). To be more specific, the control unit 21 sorts the 16 users in the order of the user B, the user E, . . . , the user M, and the user L.

Figure 11:
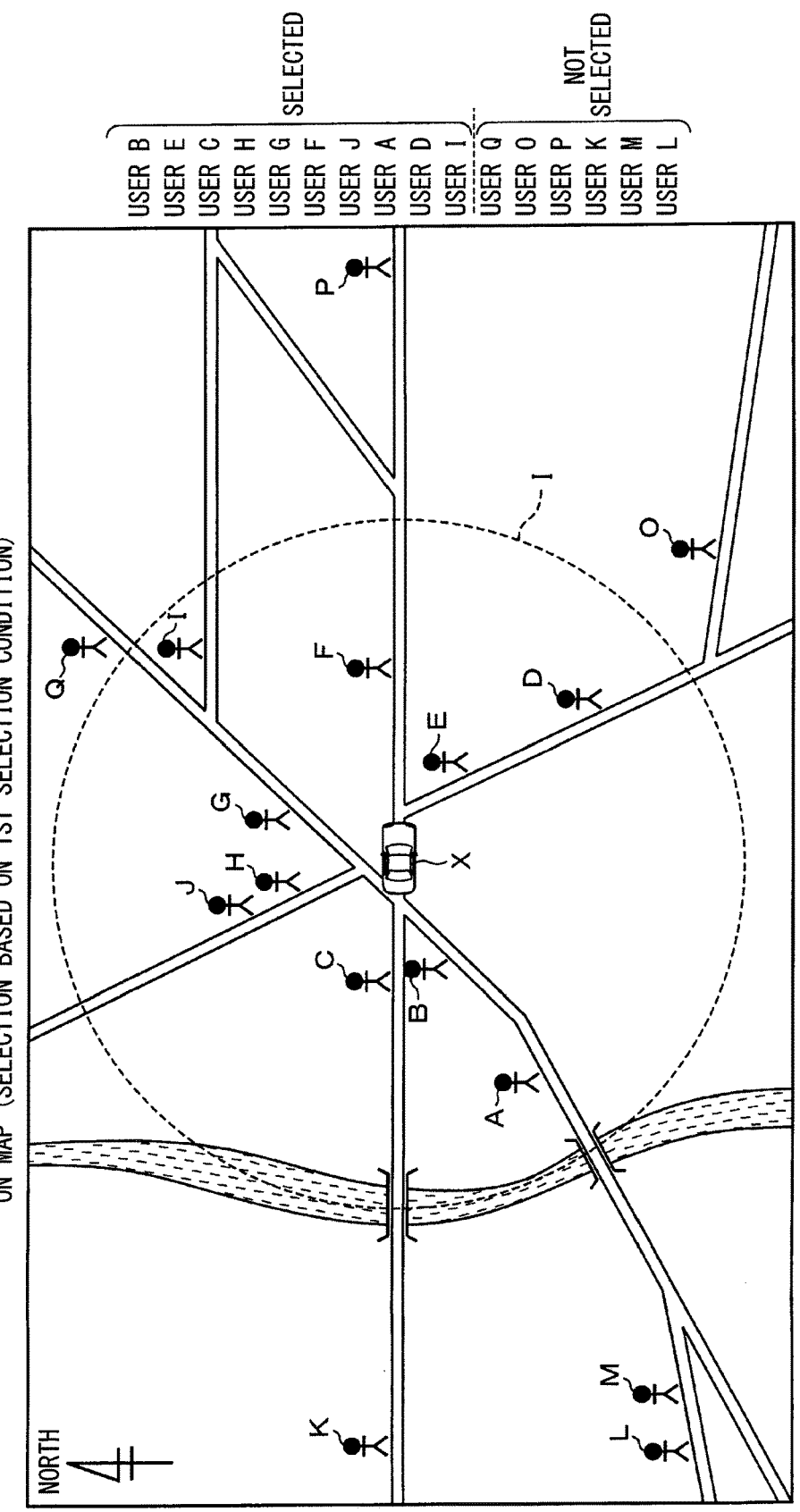
FIG. 11 is a view showing first selection condition.

Subsequently, the control unit 21 sets the maximum number of displayable users in the selection condition acquired from the vehicular communication device 3 as first selection condition, and selects users who satisfy a condition that the number of users in order of increasing distance from the present location of the portable communication terminal 2 is equal to or less than the maximum number of displayable users. More specifically, when the maximum number of displayable user is ten, as is shown in FIG. 11, the control unit 21 selects ten users out of sixteen users including the user A through the user L in order of increasing distance from the present location of the portable communication terminal 2, that is, in order of the user B, the user E, . . . , the user D, and the user I, and does not select remaining six users including the user Q, the user O, . . . , the user M, and the user L. In short, the control unit 21 selects ten users present inside a broken line I and does not select six users present outside the broken line I.

Figure 12:
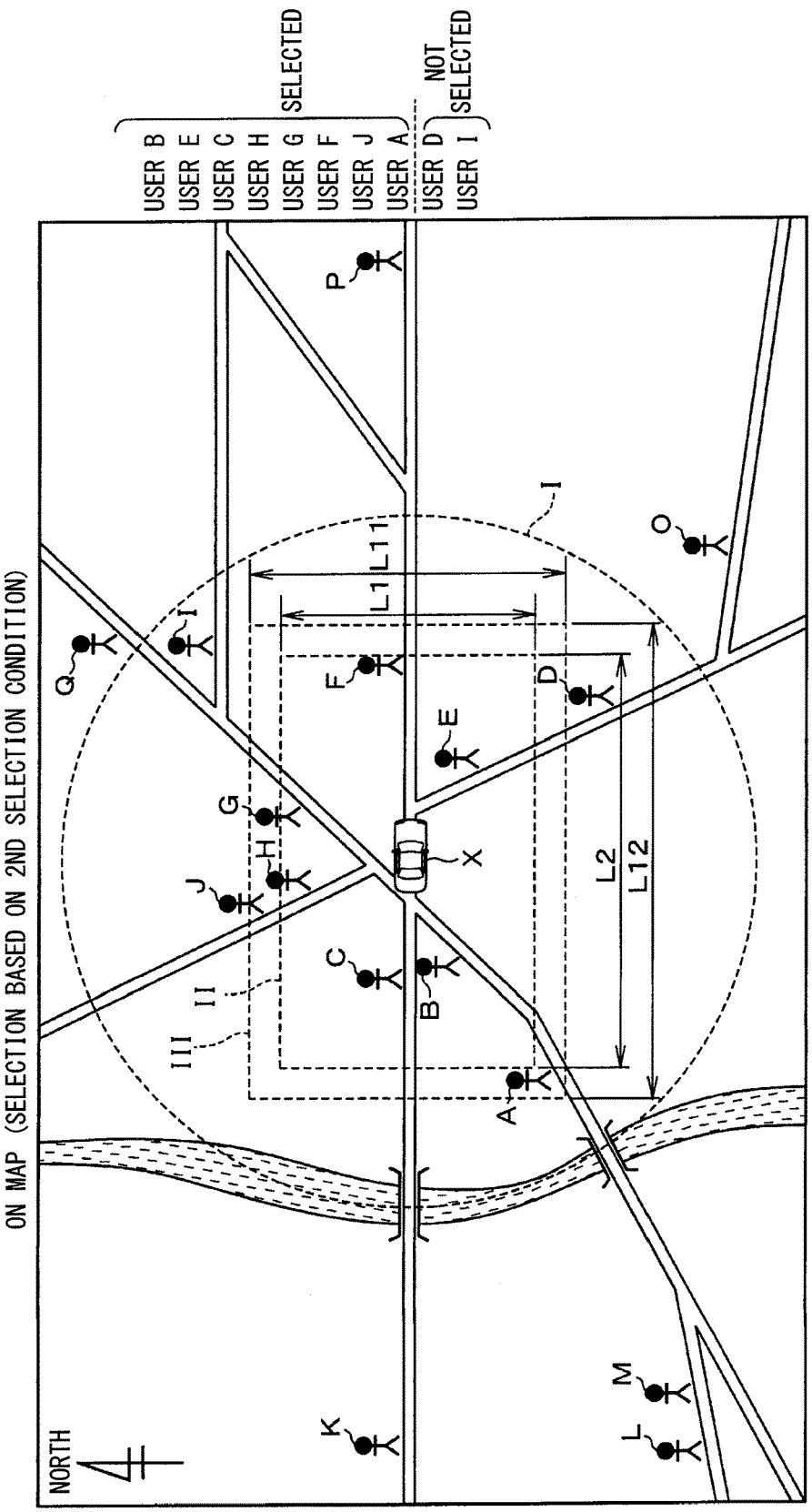
FIG. 12 is a view showing second selection condition (north-up display)

Subsequently, the control unit 21 sets a buffer range enclosing the entire display range in the selection condition acquired from the vehicular communication device 3 as second selection condition, and selects users who satisfy a condition that the number of users present in a map range corresponding to the buffer range in order of increasing distance from the present location of the portable communication terminal 2 is equal to or less than the maximum number of displayable users. More specifically, when the display reference orientation of the vehicular communication device 3 is set to the north-up display, as is shown in FIG. 12, the control unit 21 sets the display range (a range indicted by a broken line II) according to the two coordinate points acquired from the vehicular communication device 3 and also sets the buffer range (a range indicated by a broken line III).

Figure 13:
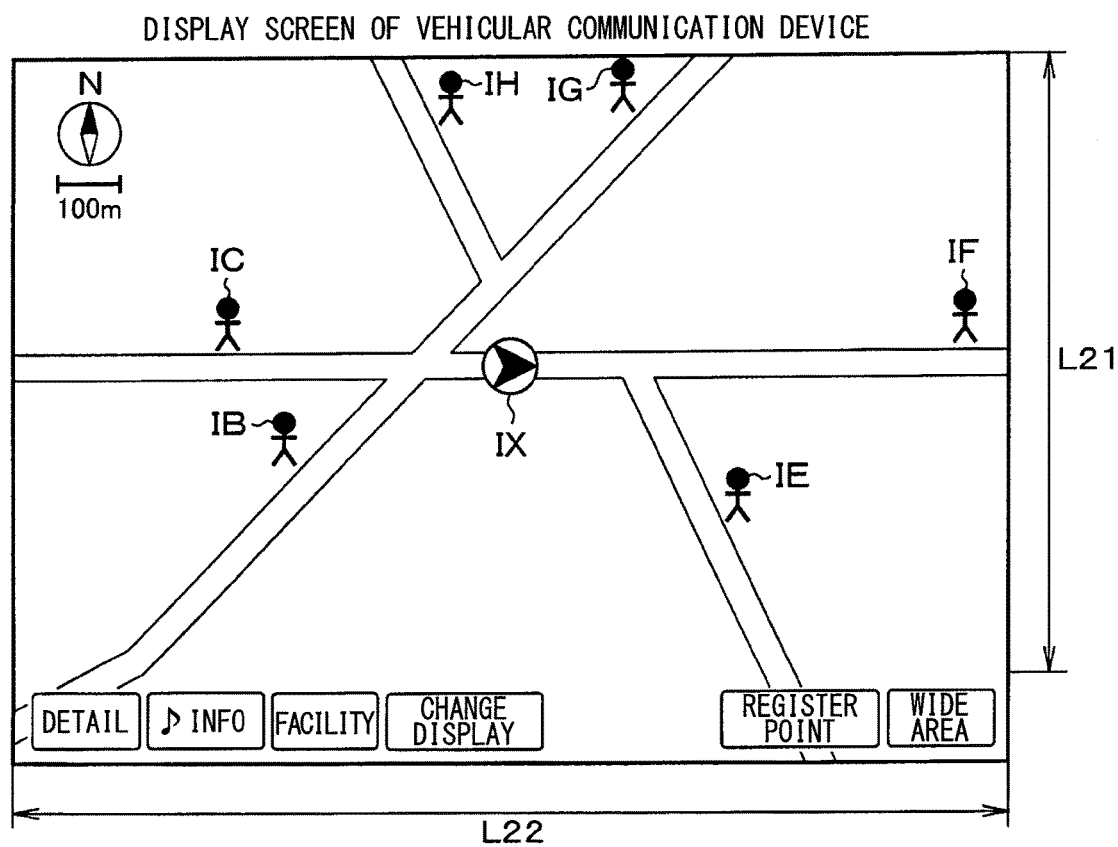
FIG. 13 is a view (part 1) showing a display screen (north-up display) of the vehicular communication device.

That is, when a display range (a region excluding various keys, such as a detail key and a display switch key) of a map screen on the display unit 35 is horizontally long as is shown in FIG. 13, the control unit 21 sets the display range and the buffer range to be horizontally long in the east-west direction with the present location of the vehicle substantially at a center. The control unit 21 sets the display rage and the buffer range in such a manner that a ratio of a short side to a long side of the display range, L1:L2, a ratio of a short side to a long side of the buffer range, L11:L12, and a ratio of a short side to a long side of the display range of the map screen on the display unit 35, L21:L22, are substantially equal. The control unit 21 selects users present within the buffer range from the users selected according to first selection condition and does not select remaining users present outside the buffer range. More specifically, the control unit 21 selects eight users including the user B, the user E, . . . , the user J, and the user A from the ten users selected according to first selection condition, and does not select remaining two users including the user D and the user I present outside the buffer range.

In a case where the maximum number of displayable users and the display range are determined as being the selection condition whereas the maximum data transfer volume is not determined as being the selection condition, the control unit 21 controls the portable communication terminal 2 to transmit the location information of the respective users who satisfy the above-described two selection conditions, including first selection condition and second selection condition, thus selected to the vehicular communication device 3 from the connection unit 23. In the vehicular communication device 3, when the location information of the respective users from the portable communication terminal 2 is received at the connection unit 32, the control unit 31 displays icons indicating the present locations of the respective users identified based on the received location information by superimposing the icons on the map screen. That is, when the location information of the respective eight users who satisfy first and second selection conditions is received at the connection unit 32, the control unit 31 selects six users present within the display range out of the eight users as display subjects. Accordingly, as is shown in FIG. 13, the control unit 31 displays six icons including an icon IB, an icon IE, . . . , an icon IG, and an icon IF respectively indicating present locations of the selected six users including the user B, the user E, . . . , the user G, and the user F present within the display range by superimposing the six icons on the map screen together with an own vehicle location mark IX indicating a present location of the vehicle X.

In the present embodiment, the control unit 21 sets the buffer range enclosing the entire display range and selects users present within the buffer range for a reason as follows. That is, in a case where the server 4 transmits location information of the respective users in the group to the portable communication terminal 2 in every predetermined period (for example, every 10 seconds), timing at which to receive the location information of the respective users in the group from the server 4 is not synchronized with timing at which the present location of the moving vehicle changes. Hence, by simply selecting the users within the display range without setting the buffer range, a user present outside the display range before may enter the display range when the present location of the moving vehicle changes. In such a case, the vehicular communication device 3 suddenly displays an icon indicating the present location of such a user by superimposing the icon on the map screen and the user may have a strange feeling. In the present embodiment, such an inconvenience is taken into consideration, and displaying an icon superimposed on the map screen all of a sudden is forestalled by setting the buffer range enclosing the entire display range for the user not to have a strange feeling.

Figure 14:
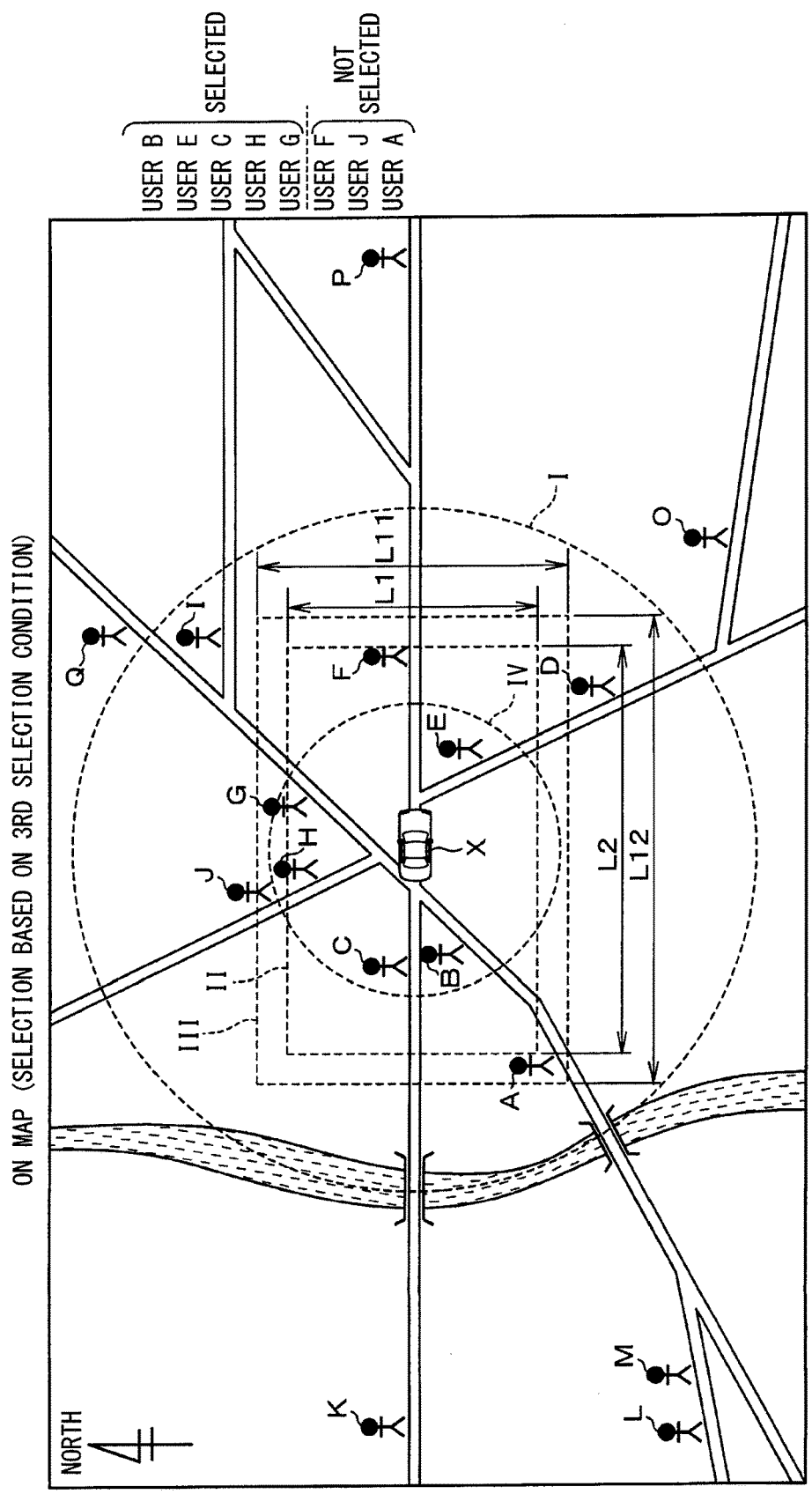
FIG. 14 is a view showing third selection condition (north-up display)

When the maximum data transfer volume is determined as being the selection condition in addition to the maximum number of displayable user and the display range, the control unit 21 sets the maximum data transfer volume in the selection condition acquired from the vehicular communication device 3 as third selection condition. The control unit 21 then selects users who satisfy a condition that the number of users present in the map range corresponding to the buffer range in order of increasing distance from the present location of the portable communication terminal 2 is equal to or less than the maximum number of displayable users to an extent that a total of data volumes does not exceed the maximum data transfer volume. More specifically, the control unit 21 adds up data volumes of the users selected as the display subjects in order of increasing distance from the present location of the portable communication terminal 2, and selects as many users as possible to an extent that a total of added data volumes does not exceed the maximum data transfer volume. That is, in a case as is shown in FIG. 14 that a total of data of five users including the user B, the user E, the user C, the user H, and the user G is equal to or less than the maximum data transfer volume whereas a total of data of six users including the user B, the user E, . . . , the user G, and the user F exceeds the maximum data transfer volume, the control unit 21 selects five users including the user B, the user E, the user C, the user H, and the user G out of the six users selected as the display subjects and does not select the remaining one user F. In short, the control unit 21 selects the five users present within the display range and inside a broken line IV and does not select one user present within the display range and outside the broken line IV. The control unit 21 does not select the two users including the user J and the user A not selected as the display subjects, either.

Figure 15:
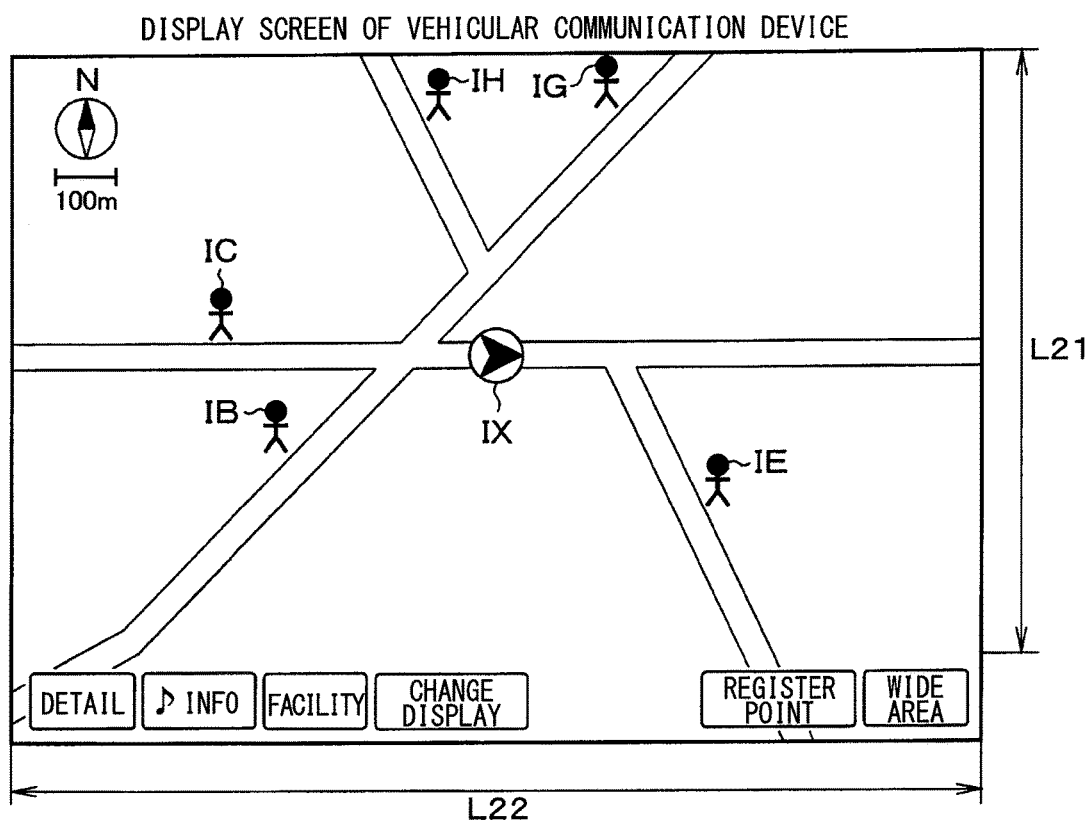
FIG. 15 is a view (part 2) showing the display screen (north-up display) of the vehicular communication device.

Subsequently, the control unit 21 controls the portable communication terminal 2 to transmit location information of the respective users who satisfy first, second and third selection conditions thus selected to the vehicular communication device 3 from the connection unit 23. In the vehicular communication device 3, when the location information of the respective users from the portable communication terminal 2 is received at the connection unit 32, the control unit 31 displays the icons indicating the present locations of the respective received users by superimposing the icons on the map screen. That is, when the location information of the five users who satisfy first, second, and third selection conditions is received at the connection unit 32, the control unit 31 sets the five users as display subjects. To be more specific, as is shown in FIG. 15, the control unit 31 displays five icons including the icon IB, the icon IE, the icon IC, the icon IH, and the icon IG respectively indicating the present locations of the five users including the user B, the user E, the user C, the user H, and the user G who satisfy first, second and third selection conditions by superimposing the five icons on the map screen together with the own vehicle mark IX indicating the present location of the vehicle X. In the present embodiment, by adding third selection condition, the user F is removed from the six users selected as the display subjects according to first and second selection conditions, and the control unit 21 eliminates the icon IF indicating the present location of the user F from the respective icons indicating the present locations of the six users selected as the display subjects according to first and second selection conditions from the map screen.

In FIG. 13 and FIG. 15, the icons of human shapes are shown as an example. Alternatively, icons may be of any shape selectable by the user. A data volume of an icon varies with a shape of the icon. Also, the above has described a case where the display reference orientation of the vehicular communication device 3 is set to the north-up display. Alternatively, the description above also applies to a case where the display reference orientation is set to the heading-up display. The following will describe the case of the heading-up display.

Figure 16:
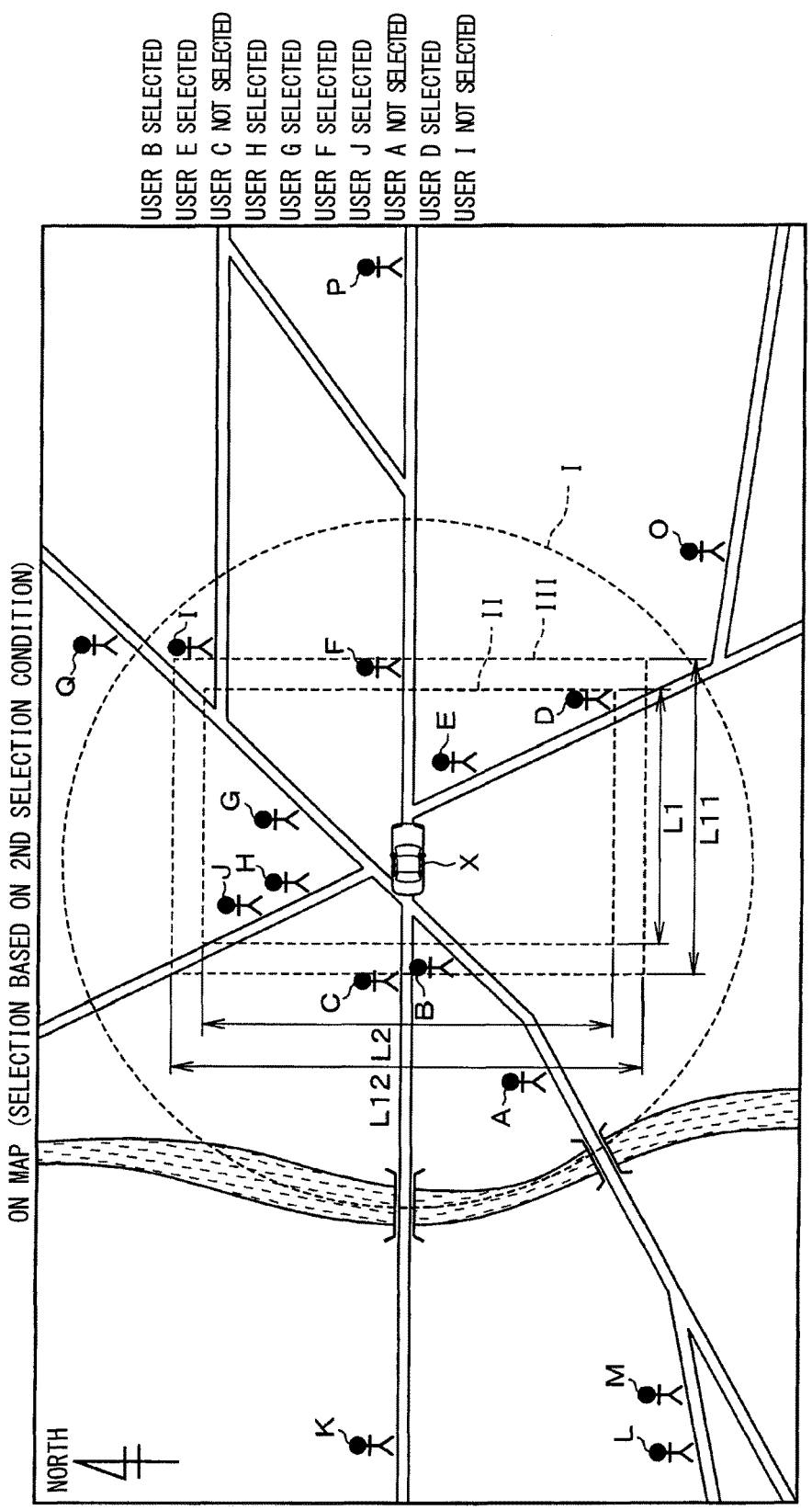
FIG. 16 is another view showing second selection condition (heading-up display)

When the display reference orientation of the vehicular communication device 3 is set to the heading-up display, as is show in FIG. 16, the control unit 21 sets the display range according to the two coordinate points acquired from the vehicular communication device 3 and further sets the buffer range. That is, when the display range of the map screen on the display unit 35 is horizontally long, the control unit 21 sets the display range and the buffer range to be horizontally long in a direction orthogonal to a traveling direction of the vehicle with the present location of the vehicle slightly off the center (an area ahead of the vehicle becomes wider than an area behind the vehicle). In such a case, too, the control unit 21 sets the display range and the buffer range in such a manner that a ratio of a short side to a long side of the display range, L1:L2, a ratio of a short side to a long side of the buffer range, L11:L12, and a ratio of a short side to a long side of the display range of the map screen on the display unit 35, L21:L22, are substantially equal. The control unit 21 then selects seven users including the user B, the user E, . . . , the user J, and the user D present within the buffer range from the ten users selected according to first selection condition and does not select remaining three users including the user C, the user A, and the user I present outside the buffer range.

Figure 17:
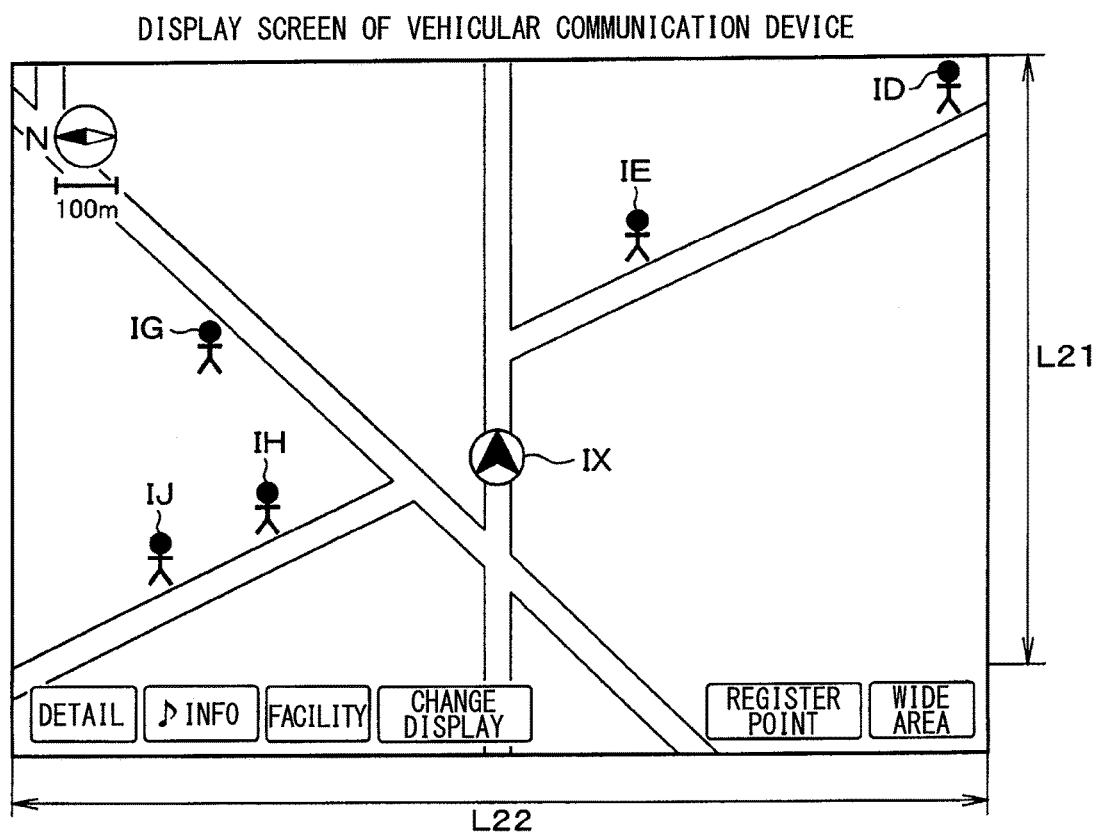
FIG. 17 is a view (part 1) showing a display screen (heading-up display) of the vehicular communication device.

In a case where the maximum number of displayable users and the display range are determined as being the selection condition whereas the maximum data transfer volume is not determined as being the selection condition, the control unit 21 controls the portable communication terminal 2 to transmit the location information of the respective users who satisfy first and second selection conditions selected as above to the vehicular communication device 3 from the connection unit 23. In the vehicular communication device 3, when the location information of the respective users from the portable communication terminal 2 is received at the connection unit 32, the control unit 31 displays icons indicating the present locations of the respective received users by superimposing the icons on the map screen. That is, when the location information of the respective seven users who satisfy first and second selection conditions is received at the connection unit 32, the control unit 31 selects five users present within the display range from the seven users as the display subjects, and as is shown in FIG. 17, displays five icons including the icon IE, the icon IH, the icon IG, the icon IJ, and the icon ID respectively indicating the present locations of the five users including the user E, the user H, the user G, the user J, and the user D by superimposing the five icons on the map screen together with the own vehicle location mark IX indicating the present location of the vehicle X.

Figure 18:
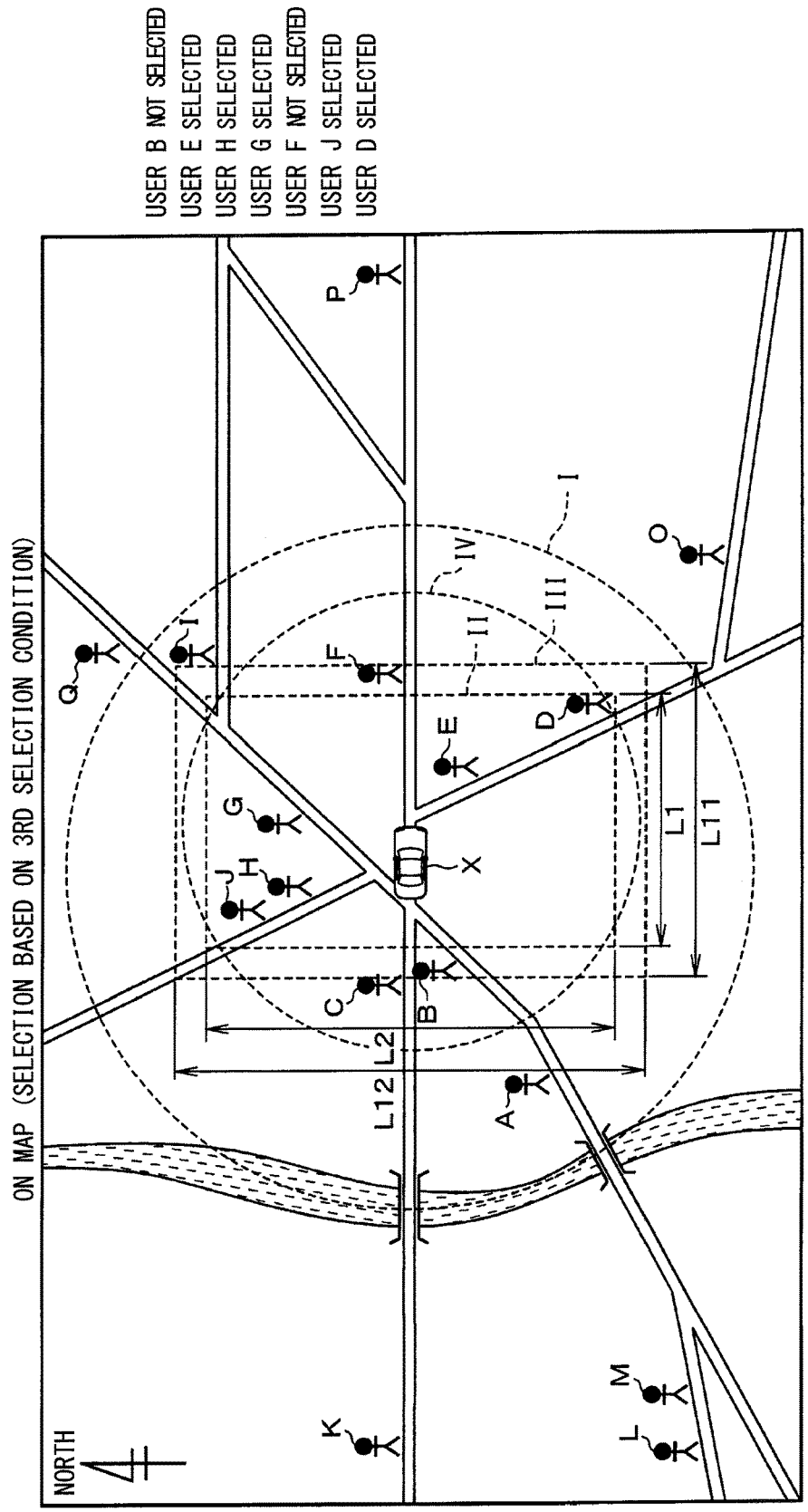
FIG. 18 is another view showing third selection condition (heading-up display)

In a case where the maximum data transfer volume is determined as being the selection condition in addition to the maximum number of displayable users and the display range, the control unit 21 adds up data volumes of the users selected as the display subjects in order of increasing distance from the present location of the portable communication terminal 2 as many as possible to an extent that a total of the added data volumes does not exceed the maximum data transfer volume. That is, in a case as is shown in FIG. 18 where a total of data volumes of the five users including the user E, the user H, the user G, the user J, and the user D is equal to or less than the maximum data transfer volume, the control unit 21 selects all the five users including the user E, the user H, the user G, the user J, and the user D selected as the display subjects. In short, the control unit 21 selects the five users present within the display range and inside the broken line IV. The control unit 21 does not select remaining users including the B and the user F not selected as the display subjects.

Figure 19:
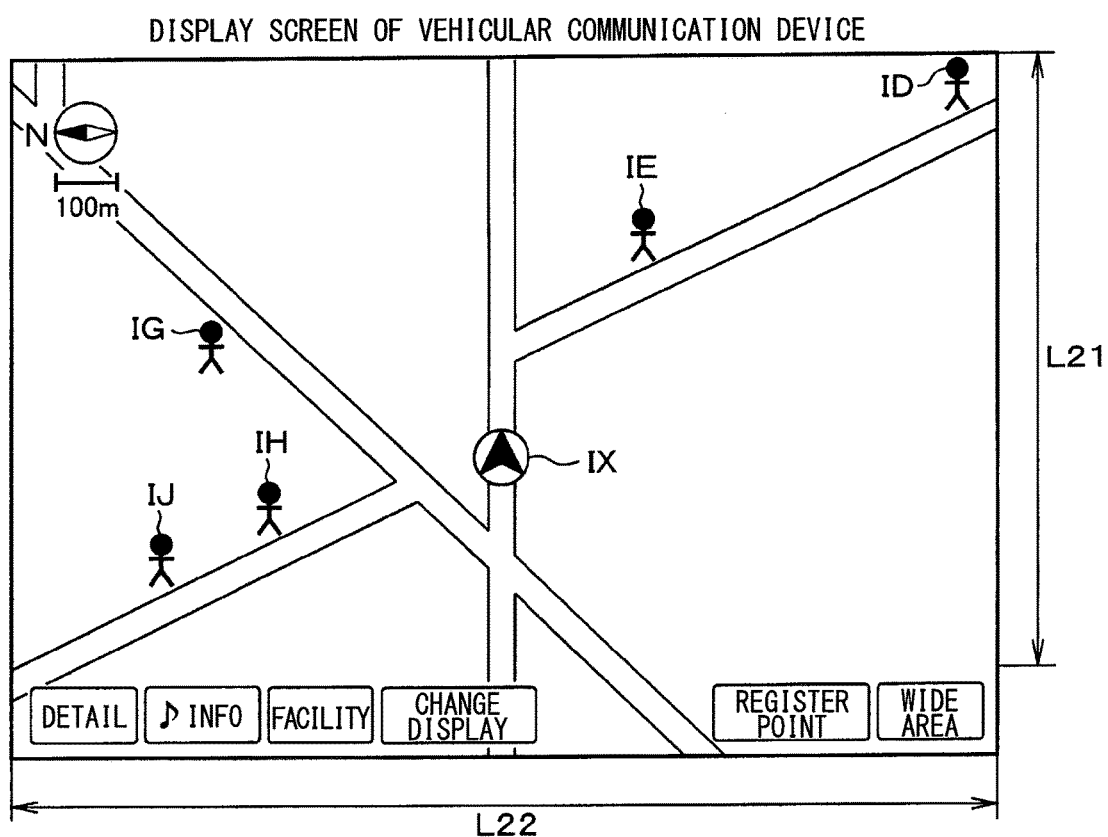
FIG. 19 is a view (part 2) showing the display screen (heading-up display) of the vehicular communication device.

Subsequently, the control unit 21 controls the portable communication terminal 2 to transmit the location information of the respective users who satisfy first, second, and third selection conditions thus selected to the vehicular communication device 3 from the connection unit 23. In the vehicular communication device 3, when the location information of the respective users from the portable communication terminal 2 is received at the connection unit 32, the control unit 31 displays the icons indicating the present locations of the received users by superimposing the icons on the map screen. That is, when the location information of the five users who satisfy first, second, and third selection conditions is received at the connection unit 32, the control unit 31 sets the five users as the display subjects, and as is shown in FIG. 19, displays five icons including the icon IE, the icon IH, the icon IG, the icon IJ, and the icon ID respectively indicating the present locations of the five users including the user E, the user H, the user G, the user J, and the user D who satisfy first, second, and third selection conditions by superimposing the five icons on the map screen together with the own vehicle position mark IX indicating the present location of the vehicle X. In other words, in the present embodiment, even when third selection condition is added, none of the five users selected as the display subjects according to the first and second selection conditions is dropped off, and the control unit 21 directly displays the icons indicating the present locations of the respective users selected as the display subjects according to first and second selection conditions by superimposing the icons on the map screen. As has been described, even when the vehicle is traveling at a same location, number of icons superimposed and displayed on the map screen may differ depending the map reduction scale and the display reference orientation set in the vehicular communication device 3.

The above has described a case where the present location of the portable communication terminal 2 is set as a reference and users are selected in order of increasing distance from the present location of the portable communication terminal 2 as an example. Because the present location of the portable communication terminal 2 and the present location of the vehicular communication device 3 are substantially same, the present location of the vehicular communication device 3 may be alternatively set as a reference and users may be selected in order of increasing distance from the present location of the vehicular communication device 3.

As has been described above, effects as follows can be obtained by the present embodiment.

In the location information display system 1, when the portable communication terminal 2 acquires the selection condition from the vehicular communication device 3, the portable communication terminal 2 does not transmit location information of all the users belonging to the group received from the server 4, and instead transmits location information of respective users who satisfy the acquired selection condition to the vehicular communication device 3. The configuration as above is capable of forestalling a variety of problems possibly occurring in the vehicular communication device 3, for example, an icon indicating a present location of a user remote from the vehicular communication device and therefore of low importance is also displayed wastefully or a quite long time is required to start to display many icons. The vehicular communication device 3 is thus capable of appropriately displaying icons indicating present locations of the respective users on the map screen.

Also, the maximum number of displayable users is used as the selection condition to select users who satisfy a condition that the number of users in order of increasing distance from the present location of the portable communication terminal 2 is equal to or less than the maximum number of displayable users. Hence, the users can be selected in reference to distances from the present location of the portable communication terminal 2. Also, the display range is used as the selection condition to select users who satisfy a condition that users are present in the map range corresponding to the buffer range enclosing the entire display range. Hence, users can be selected in reference to the display range. Further, the maximum data transfer volume is used as the selection condition to select users who satisfy a condition that a total of data volumes of users in order of increasing distance from the present location of the present location of the portable communication terminal 2 does not exceed the maximum data transfer volume. Hence, user can be selected in reference to a total of data volumes.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The embodiment above has described the configuration to set the buffer region as an example. Alternatively, setting of the buffer region may be omitted, and users who satisfy a condition that users are in a map range corresponding to the display range may be directly selected instead.

In the vehicular communication device 3, the control unit 31 may determine the selection condition to be notified to the portable communication terminal 2 in any manner. That is, the control unit 31 may monitor an overall processing load of the vehicular communication device 3. For example, when a processing load other than the processing load to acquire the location information from the portable communication terminal 2 is relatively low, the control unit 31 may set fewer number of selection conditions to acquire a larger amount of location information. Conversely, when a processing load other than the processing load to acquire the location information from the portable communication terminal 2 is relative high, the control unit 31 may set greater number of selection conditions to acquire a limited amount of location information.

The invention claimed is:

1. A location information display system comprising:
   a portable communication terminal receiving location information of respective users belonging to a predetermined group from a server; and
   a vehicular communication device receiving the location information from the portable communication terminal and displaying icons indicating present locations of the respective users identified based on the received location information by superimposing the icons on a map screen,
   wherein:
   the vehicular communication device notifies the portable communication terminal of a display range as a selection condition;
   the portable communication terminal acquires the display range as the selection condition from the vehicular communication device, selects one or more users who satisfy a condition that the one or more users are present in a map range corresponding at least to the display range, and transmits the location information of the selected one or more users to the vehicular communication device;
   the vehicular communication device notifies the portable communication terminal of a maximum data transfer volume as the selection condition; and
   the portable communication terminal which acquires the maximum data transfer volume as the selection condition from the vehicular communication device, and selects the one or more users who satisfy a condition that a total of data volumes of the one or more users in order of increasing distance from a present location of the portable communication terminal or a present location of the vehicular communication device does not exceed the maximum data transfer volume.

2. The location information display system according to claim 1, wherein:
   the vehicular communication device notifies the portable communication terminal of a maximum number of displayable users as the selection condition; and
   the portable communication terminal acquires the maximum number of displayable users as the selection condition from the vehicular communication device, and selects the one or more users who satisfy a condition that a total number of the one or more users selected in order of increasing distance from a present location of the portable communication terminal or a present location of the vehicular communication device is equal to or less than the maximum number of displayable users.

3. The location information display system according to claim 1, wherein:
   the portable communication terminal sets a buffer range including the display range, and selects the one or more users who satisfy a condition that the one or more users are present in map range corresponding to the buffer range.

4. A location information display system comprising:
   a portable communication terminal receiving location information of respective users belonging to a predetermined group from a server; and
   a vehicular communication device receiving the location information from the portable communication terminal and displaying icons indicating present locations of the respective users identified based on the received location information by superimposing the icons on a map screen, wherein:

the vehicular communication device notifies the portable communication terminal of a maximum number of displayable users, a display range, and a maximum data transfer volume as a selection condition; and the portable communication terminal acquires the at least one of the maximum number of displayable users, the display range, or the maximum data transfer volume as the selection condition from the vehicular communication device, selects one or more users who satisfy all of a condition that a total number of the one or more users selected in order of increasing distance from a present location of the portable communication terminal or a present location of the vehicular communication device is equal to or less than the maximum number of displayable users, a condition that the one or more users are present in a map range corresponding at least to the display range, and a condition that a total of data transfer volumes of the one or more users in order of increasing distance from the present location of the portable communication terminal or the present location of the vehicular communication device does not exceed the maximum data transfer volume, and transmits the location information of the selected one or more users to the vehicular communication device.

5. The location information display system according to claim 4, wherein:

the portable communication terminal sets a buffer range including the display range, and selects the one or more users who satisfy all of the condition that the total number of the one or more users selected in order of increasing distance from the present location of the portable communication terminal or the present location of the vehicular communication device is equal to or less than the maximum number of displayable users, the condition that the one or more users are present in the map range corresponding to the buffer range, and the condition that a total of data transfer volumes of the one or more users in order of increasing distance from the present location of the portable communication terminal or the present location of the vehicular communication device does not exceed the maximum data transfer volume.

6. A portable communication terminal which receives location information of respective users belonging to a predetermined group from a server, wherein the portable communication terminal configures a location information display system together with a vehicular communication device which displays icons indicating present locations of the respective users identified based on the location information received from the portable communication terminal by superimposing the icons on a map screen, the portable communication terminal comprising:

a selection condition acquisition a maximum number of displayable users, a display range, and a maximum data transfer volume as selection conditions from the vehicular communication device;

a selection part selecting one or more users who satisfy all of a condition that a total number of the one or more users selected in order of increasing distance from a present location of the portable communication terminal or a present location of the vehicular communication device is equal to or less than the maximum number of displayable users, a condition that the one or more users are present in a map range corresponding at least to the display range, or a condition that a total of data transfer volumes of the one or more users in order of increasing distance from the present location of the portable communication terminal or the present location of the vehicular communication device does not exceed the maximum data transfer volume as the selection condition acquired by the selection condition acquisition part; and a transmission control part controlling the portable communication terminal to transmit the location information of the one or more users selected by the selection part to the vehicular communication device through a connection unit.

7. The portable communication terminal according to claim 6, wherein:

the portable communication terminal sets a buffer range including the display range, and selects the one or more users who satisfy all of the condition that the total number of the one or more users selected in order of increasing distance from the present location of the portable communication terminal or the present location of the vehicular communication device is equal to or less than the maximum number of displayable users, the condition that the one or more users are present in the map range corresponding to the buffer range, and the condition that a total of data transfer volumes of the one or more users in order of increasing distance from the present location of the portable communication terminal or the present location of the vehicular communication device does not exceed the maximum data transfer volume.

* * * * *